United States Patent
Chendamarai Kannan et al.

(10) Patent No.: US 11,864,164 B2
(45) Date of Patent: Jan. 2, 2024

(54) MULTIPLE BEAM MONITORING AND TRANSMITTING IN A WIRELESS MEDIUM

(71) Applicant: QUALCOMM Incorporated, San Diego, CA (US)

(72) Inventors: Arumugam Chendamarai Kannan, San Diego, CA (US); Jing Sun, San Diego, CA (US); Xiaoxia Zhang, San Diego, CA (US); Vinay Chande, San Diego, CA (US); Srinivas Yerramalli, Hyderabad (IN); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/302,861

(22) Filed: May 13, 2021

(65) Prior Publication Data
US 2021/0360600 A1 Nov. 18, 2021

Related U.S. Application Data

(60) Provisional application No. 63/026,655, filed on May 18, 2020.

(51) Int. Cl.
*H04W 72/121* (2023.01)
*H04W 72/044* (2023.01)
*H04L 5/00* (2006.01)
*H04W 16/28* (2009.01)

(52) U.S. Cl.
CPC .......... *H04W 72/044* (2013.01); *H04L 5/0055* (2013.01); *H04W 16/28* (2013.01); *H04W 72/121* (2013.01)

(58) Field of Classification Search
CPC . H04W 72/044; H04W 16/28; H04W 72/121; H04W 74/0808; H04L 5/0055; H04B 7/0408; H04B 7/0695
See application file for complete search history.

(56) References Cited

U.S. PATENT DOCUMENTS

| | | | | |
|---|---|---|---|---|
| 2005/0288011 A1* | 12/2005 | Dutta | .................. | H04B 7/18539 455/12.1 |
| 2017/0366992 A1* | 12/2017 | Rune | .................... | H04B 7/0617 |
| 2018/0115305 A1* | 4/2018 | Islam | ................... | H04B 7/0417 |

(Continued)

*Primary Examiner* — Edan Orgad
*Assistant Examiner* — Malick A Sohrab
(74) *Attorney, Agent, or Firm* — QUALCOMM Incorporated

(57) ABSTRACT

The present disclosure relates to apparatus and methods of monitoring a region by a transmitting device within a wireless medium for transmissions using at least one directional beam covering the region. Upon determining that the region in the wireless medium is free of transmissions, the transmitting device transmits to a plurality of wireless devices in the region using a plurality of spatially separated directional beams. Other aspects of the disclosure relate to apparatus and methods for receiving an instruction, e.g., at a user equipment (UE), to perform a channel assessment at a first time. The UE monitors a region within a wireless medium for transmissions after receiving the instruction. Upon determining that the region is free of transmissions, the UE may send an acknowledgment of the received instruction.

18 Claims, 17 Drawing Sheets

(56) References Cited

U.S. PATENT DOCUMENTS

| | | | | |
|---|---|---|---|---|
| 2018/0302908 A1* | 10/2018 | Aijaz | .................... | H04L 45/28 |
| 2019/0116614 A1* | 4/2019 | Li | ........................ | H04W 76/27 |
| 2019/0230706 A1* | 7/2019 | Li | ........................ | H04B 7/088 |
| 2020/0092913 A1* | 3/2020 | Xu | .................... | H04W 72/0446 |
| 2021/0014896 A1* | 1/2021 | Tang | .................... | H04W 16/14 |
| 2021/0045154 A1* | 2/2021 | Ahn | .................... | H04B 7/0617 |
| 2021/0410187 A1* | 12/2021 | Yang | ................ | H04W 74/0808 |

\* cited by examiner

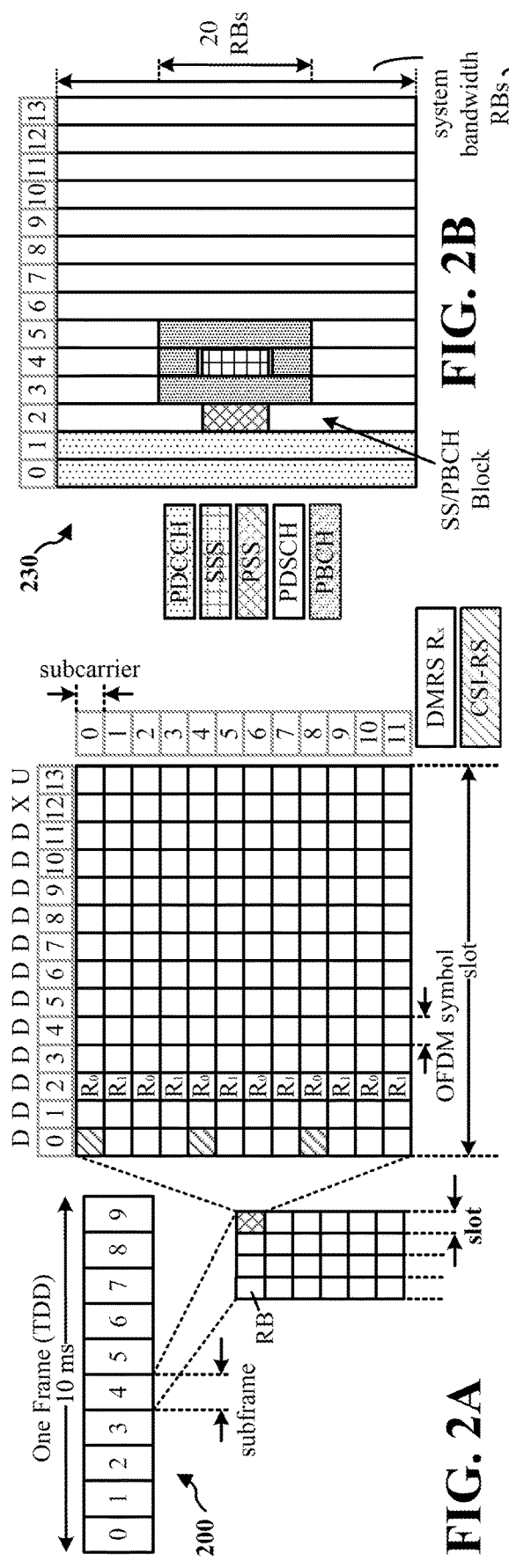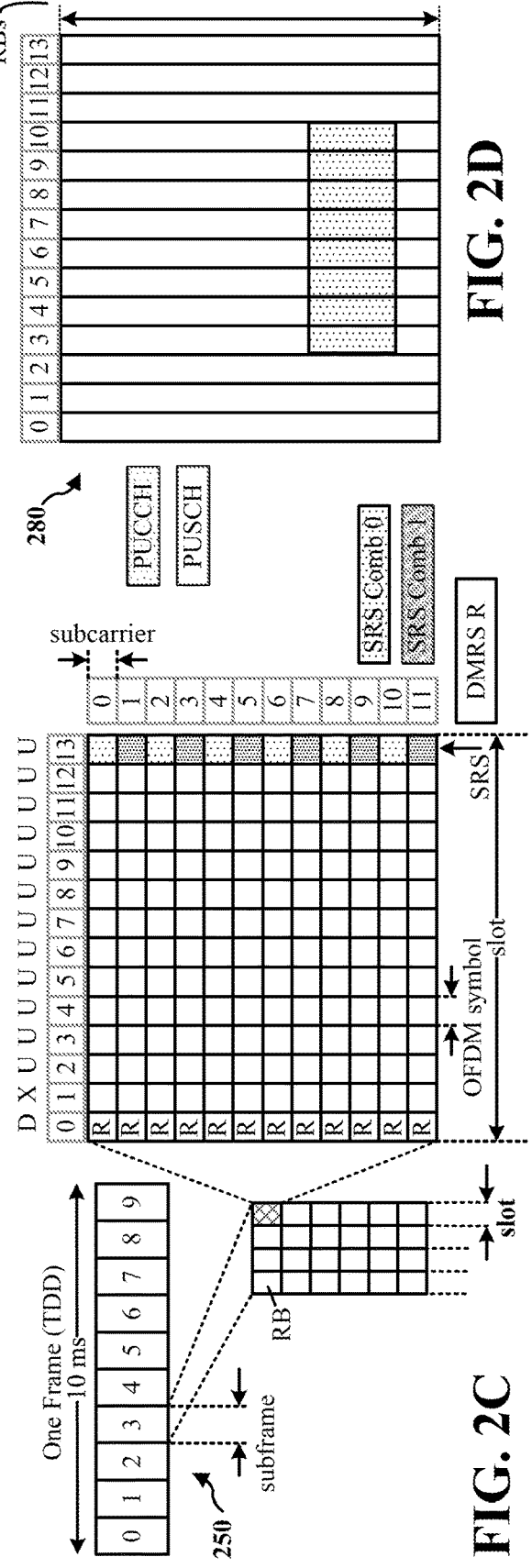
FIG. 2A  FIG. 2B  FIG. 2C  FIG. 2D

MULTIPLE BEAM MONITORING AND TRANSMITTING IN A WIRELESS MEDIUM

CROSS-REFERENCE TO RELATED APPLICATIONS

This application claims the benefit, and right of priority to, U.S. Provisional Patent Application No. 63/026,655 filed May 18, 2020, the contents of which are incorporated by reference as if expressly set forth herein.

TECHNICAL FIELD

The present disclosure relates generally to communication systems, and more particularly, to apparatus and methods of multiple-beam monitoring of, and transmissions over, a wireless medium.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. In particular, improving network communication procedures is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including monitoring a region within a wireless medium for transmissions using at least one directional beam covering the region, and upon determining that the region in the wireless medium is free of transmissions, transmitting to a plurality of wireless devices in the region using a plurality of spatially separated directional beams.

Another example implementation includes an apparatus for wireless communication including a memory and a processor in communication with the memory and configured to monitor a region within a wireless medium for transmissions using at least one directional beam covering the region, and upon determining that the region in the wireless medium is free of transmissions, transmit to a plurality of wireless devices in the region using a plurality of spatially separated directional beams Another example implementation includes an apparatus for wireless communication, including means for monitoring a region within a wireless medium for transmissions using at least one directional beam covering the region, and means for transmitting, upon determining that the region in the wireless medium is free of transmissions, to a plurality of wireless devices in the region using a plurality of spatially separated directional beams.

Another example implementation includes a computer-readable medium including stored instructions for wireless communication, executable by a processor to monitor a region within a wireless medium for transmissions using at least one directional beam covering the region, and upon determining that the region in the wireless medium is free of transmissions, transmit to a plurality of wireless devices in the region using a plurality of spatially separated directional beams.

Another example implementation includes a method of wireless communication, including receiving an instruction to perform a channel assessment at a first time, monitoring a region within a wireless medium for transmissions after receiving the instruction, and transmitting, upon determining that the region is free of transmissions, an acknowledgment of the received instruction.

Another example implementation includes an apparatus for wireless communication including a memory and a processor in communication with the memory and configured to receive an instruction to perform a channel assessment at a first time, monitor a region within a wireless medium for transmissions after receiving the instruction, and transmit, upon determining that the region is free of transmissions, an acknowledgment of the received instruction.

Another example implementation includes an apparatus for wireless communication including means for receiving an instruction to perform a channel assessment at a first time, means for monitoring a region within a wireless medium for transmissions after receiving the instruction, and means for transmitting, upon determining that the region is free of transmissions, an acknowledgment of the received instruction.

Another example implementation includes a computer-readable medium including stored instructions for wireless communication, executable by a processor to receive an instruction to perform a channel assessment at a first time, monitor a region within a wireless medium for transmissions after receiving the instruction, and transmit, upon determining that the region is free of transmissions, an acknowledgment of the received instruction.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively.

DETAILED DESCRIPTION

Figure 1:
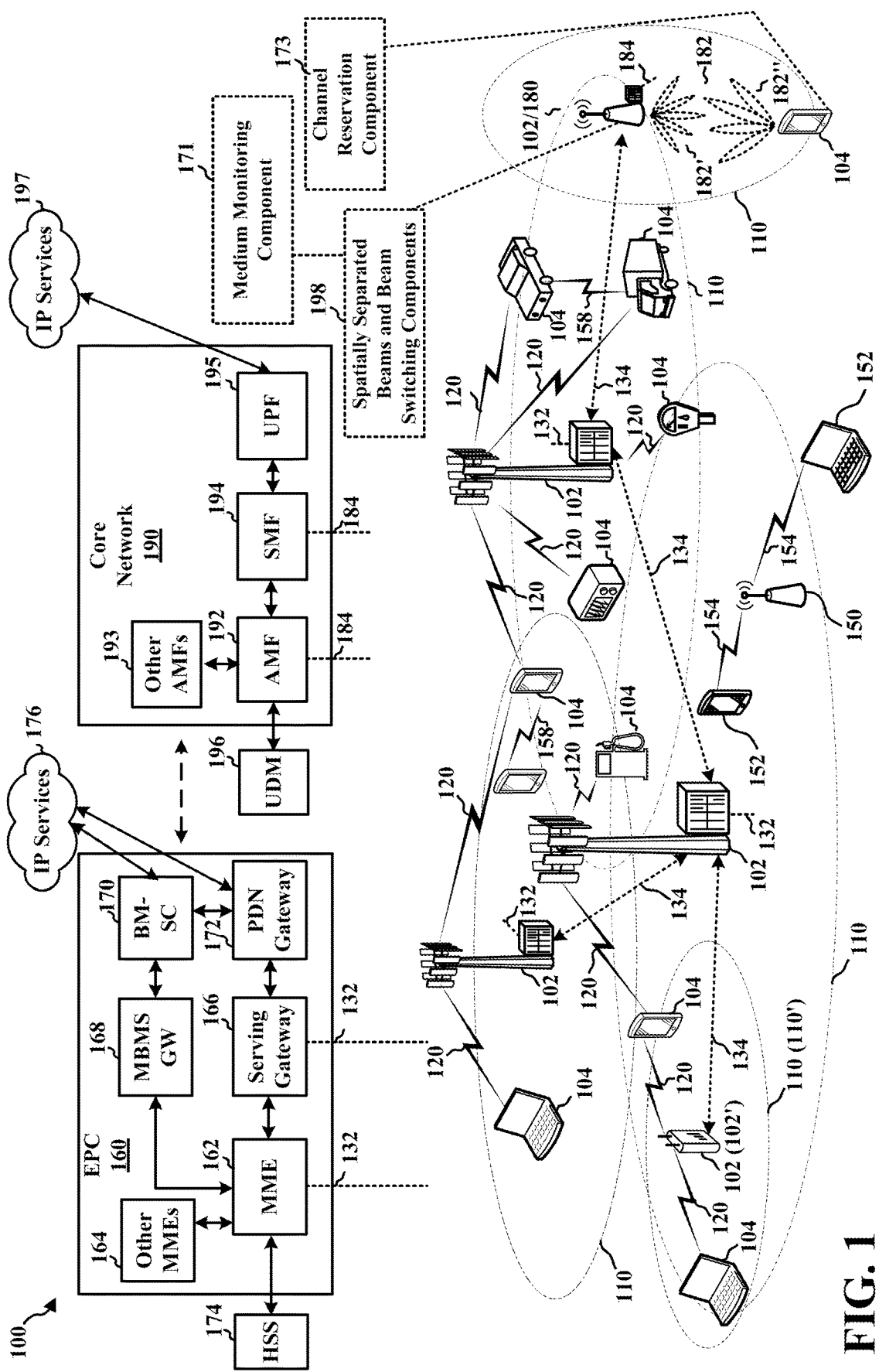
FIG. 1 is a diagram of an example of a wireless communications system and an access network, including base stations and user equipment (UEs) configured to perform aspects as described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In 5G NR, wireless technologies have been expanded into the unlicensed spectrum. The unlicensed spectrum may occupy frequencies up to 60 GHz, also known as mmWave. In part because the spectrum is unlicensed, there is no pre-existing consensus as to how wireless communication devices will share the spectrum. As a result, implementation of technologies including but not limited to 5G NR can result in significant interference problems as different devices attempt to transmit over the same medium.

The present disclosure is directed to apparatus and methods for performing, by a transmitting device, wide beam monitoring of a wireless medium or region therein, and for transmitting, using multiple transmit beams, data to other wireless devices (e.g., UEs) in the medium upon determining that the medium is free from other potentially interfering transmissions. In various aspects of the disclosure, the wide beam used in the monitoring procedure is configured to include a combination of directional components of multiple narrow beams to be used in an anticipated transmission procedure that may follow the monitoring or channel assessment procedure if the channel is clear. In various aspects of the disclosure, the monitoring and transmitting may be conducted by a transmitting device such as, for example, a base station (e.g., a gNodeB (gNB), Node B (nB), or the like). The transmitting device monitors a region in the wireless medium using a contiguous contention window (CCW), such as a listen-before-talk (LBT) procedure, a clear channel assessment (CCA), or similar technique. According to one aspect of the disclosure, the monitoring may be performed using a wide beam that includes directional components toward the intended recipient wireless devices. Upon sensing that the monitored region within the medium is free of transmissions, the transmitting device may proceed to perform one or more transmissions to a plurality of base stations using spatially separated beams. In an implementation, the transmitting device performs transmissions by multiplexing wireless signals to different wireless devices using narrower beams specific to the location of the wireless devices.

As an example of these techniques, a base station may determine that it has information to transmit to one or more of a plurality of wireless devices that may be located in the region. One factor that may govern the base station's decision to transmit to a plurality of wireless devices during an available transmission period may be the duration of the period, as defined in certain wireless standards or specifications (such as 5G NR, for instance). More specifically, in a case where the duration may be particularly long, it may be desirable to perform transmissions to multiple wireless devices, rather than a single device, to maximize overall throughput.

The base station may operate over any suitable range of frequencies. The base station may, for example, be configured to transmit and receive wireless signals in the millimeter wave (mmW) band of frequencies, which includes radio waves that lie within the frequency range of 30-300 GHz. Alternatively, in some wireless technologies, the base station may be configured to transmit and receive data in the microwave band, which is defined to cover the 3-30 GHz range. These frequency ranges are exemplary in nature, and other frequencies of transmission are also possible depending on the configuration of the base station and wireless devices.

The base station may first monitor the medium to check for interfering signals. The monitoring procedure may, as noted, include LBT, CCA, or any other mechanism for attempting to detect ongoing transmissions over the medium that otherwise may be recognized by the base station as likely to result in interference if the base station proceeds to use the medium to perform a transmission to an intended recipient wireless device. By contrast, if the base station does not detect any ongoing transmissions or significant energy sources in the region, the base station may determine that it is more likely to be able to conduct transmissions without interfering with and potentially degrading ongoing wireless communications conducted by other unrelated devices operating in the same frequency band, for example.

Because of the high signal path loss that is traditionally associated with these mmW frequencies, it is often desirable for a wireless device to implement beamforming or spatial division multiplexing techniques when monitoring the channel and when transmitting and receiving data. Among other benefits, these directional transmissions may be sufficient to overcome the path losses associated with mmW frequency bands by concentrating the transmission energy in the direction of the wireless device (if known), rather than other arbitrary directions that are neither relevant nor beneficial to the communications. Concentrating the beam in a particular direction or set of directions may assist in effecting successful communication with the wireless devices, especially over mmW or near mmW frequencies.

In an implementation, the transmitting device performs the LBT procedure or other channel assessment using an array of antennas that produces one or more phase shifted, directional beams to monitor the region such as by sensing energy in the region. If the sensed energy is at or below a threshold, the transmitting device may determine that it is free to transmit wireless signals to wireless devices within the region. The antenna gain of the array may be adjusted in addition to the direction of the beam to produce a desired transmission targeting the wireless devices desired.

Various aspects of the disclosure include using such directional beams in specific configurations by the communicating devices, both in the initial clear channel assessment (CCA) monitoring procedure (e.g., using LBT) and as desirable, in the ensuing transmission operations. In addition, various aspects of the disclosure include using directional beam switches to perform spatial multiplexing techniques and also to enable other types of multiplexing, including time division multiplexing and frequency division multiplexing.

Various aspects of the disclosure include transmitting channel reservation signals by the plurality of wireless devices (e.g., user equipments, mobile stations, IoT-configured receivers, etc.), including devices that are receiving data or are likely to receive data from the base station. Channel reservation signals, also referred to herein as simply reservation signals, may include signals periodically sent by receiving wireless devices to alert other sources of wireless communication in the vicinity that the medium is in use. The receiving device's use of reservation signal transmissions may increase the likelihood that another potential transmitting source in the vicinity may receive the signal. As a result, the other potential transmitter may defer or cancel its transmission, thereby avoiding a potentially costly, overhead and bandwidth consuming collision in which all data to all recipient devices may be lost. Channel reservation signals may include data, or in other implementations, they may include short bursts of energy that an unrelated receiver in the region may detect and consequently defer transmission to avoid a collision.

In various aspects of the disclosure, the beamforming and spatial division multiplexing techniques described herein may similarly be applied by the base station in the initial monitoring operation by the base station of the medium to assess the likelihood of interference with other ongoing wireless communications. In sensing an energy of the medium, for example, the base station may first identify a location, if known, of each of the plurality of wireless devices that the base station may determine are potential candidate devices for receiving data transmissions. Based on these locations and other information, the base station may identify a region in the medium over which the base station may perform transmissions in a subsequent transmission operation. If the base station senses energy indicative of other transmissions or less than ideal channel situations, the base station may temporarily reserve its resources and defer the transmission operation.

In various implementations as noted, the base station uses an array of antennas (or other equipment, including adjustable antennas, dedicated directional antennas, steerable antennas, etc.). The base station may phase-shift or time delay the antenna current in each individual antenna of the array to thereby produce one or more directional beams covering the region. The base station may use similar techniques to both receive energy and signals (e.g., perform a clear channel assessment, receive data, etc.) using the directional beam, and to transmit data, over the medium. In the monitoring procedure as well as a transmission operation, the base station may therefore strategically time-delay or phase-shift signal transmissions received from individual antennas in the array to effectively produce a receiving directional beam. Further, the base station may use multiple such beams and one or more antenna arrays to multiplex transmissions to a corresponding plurality of UEs in the region that may be scheduled to receive data.

As an illustration, in the case where the base station initiates an LBT in advance of a transmission operation indented for two wireless devices in the region, the base station may determine to use two narrow directional beams, B1 and B2, in the upcoming transmission operation. The base station therefore may monitor the region using a receive beam ("B12") that is wider than each of the individual narrow beams B1 and B2. Using this configuration, the base station selectively senses only the region of the medium that it is likely to use in the upcoming transmission operation, where the danger of collisions with other transmissions may be greater and more likely to interfere with a transmission. The base station may, in these implementations, determine not to transmit the beam in other directions from which unrelated transmissions may be potentially less perilous.

In an implementation, the base station may assign an energy threshold for use during the CCA/LBT procedure, and with which the received energy within beam B12 may be compared. Provided that the received energy sensed by the base station using B12 is less than this threshold, the base station may determine that the medium is clear and that it can initiate a transmission operation to the two wireless devices B1 and B2. The base station may then immediately (or after a period) initiate a transmission operation to one or both of the wireless devices using individual beams B1 and B2 for multiplexing the transmissions to the device. It should be understood that other mechanisms may be used for performing the channel assessment or LBT, as well as the data transmissions, and those mechanisms may be deemed to fall within the scope of the present disclosure. As one example, in some implementations, the threshold determination may be a plurality of threshold determinations used in the contention window over a time period.

In an implementation, when the receive beam is configured to be directionally narrow during an LBT procedure such that the beam only covers a small portion or "slice" of the region, the threshold may be set higher than if the beam were wider. Using a narrow beam, the ensuing reception of energy over the spectrum of interest in the direction of the beam will be stronger and can potentially survive more interference. Thus, a subsequent transmission operation by the base station in that direction may be more likely to succeed. Conversely, where the beam is wider during the LBT, wireless devices in the vicinity will be more likely to cause interference, because the same beam energy may be used to detect interference over a larger region.

Accordingly, in another implementation, the threshold for the LBT may be set lower as the beam is widened. For a stronger and narrower beam, conversely, the threshold in some embodiments may be made higher. It should be appreciated that in specific situations, other considerations may militate against varying the threshold of energy for determining whether to enable a subsequent transmission. In still another implementation, the base station may be configured to lower or raise the threshold when its footprint is boosted via the transmission by neighboring UEs of reservation signals as discussed herein.

In general, the ability for the base station to dynamically configure the threshold during contention provides numerous benefits, including allowing the base station to transmit even in a relatively noisy medium because the energy of transmission may be sufficient to overcome the noise, which results in greater overall throughput and efficiency. Further, setting the threshold in this manner may discourage the base station from transmitting over a wider range if even small amounts of energy would be sufficient to interfere with the signals, which preserves overall bandwidth.

As noted above, the base station may find it particularly desirable to transmit to multiple wireless devices in light of the relatively long duration of the transmission period according to various standards or proposals (such as in 5G NR). Accordingly, in various aspects of the disclosure, the base station may use beam switching to transmit to a plurality of wireless devices, e.g., using a corresponding plurality of spatially separated directional beams. In an implementation, each beam can be multiplexed to one of the wireless devices. Beam switching can be performed in the time domain to multiplex the wireless signals to different wireless devices. In addition, the use of multiple beams may allow for the use of any of spatial division multiplexing, frequency division multiplexing, and time division multiplexing techniques to maximize throughput and therefore network efficiency. In some implementations, the base station can dynamically schedule different wireless devices to receive transmissions based on the amount of information that the base station needs to transmit to a given wireless device, the conditions of the medium (e.g., the medium may be clear in the direction of certain beams but noisy in the direction of others), priorities known at the base station as governed by various standards, and other factors. In an implementation, the narrow beams used in the beam switching transmissions are configured to fall within the directions assessed using the wider beam in the prior channel assessment procedure, increasing the likelihood that the assessed regions of the medium will be clear for transmission. For example, if the wider area is deemed clear during an initial LBT, then a narrower beam within that wider beam but with greater energy may stand at least as much chance or greater of being received error-free, all things being equal.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system and an access network 100 (also referred to as a wireless wide area network (WWAN)) includes a base station 102 in communication with a user equipment (UE) 104 in a manner that allows for efficient group beam reporting.

In the wireless communications system and an access network 100, the base stations 102 and UEs 104 may additionally be in communication with an Evolved Packet Core (EPC) 160 and/or another core network 190, such as but not limited to a 5G Core (5GC). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an NB, eNB, gNB, or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 and the UE 104 may utilize beamforming 182 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

Medium Monitoring Component 171 may be responsible for performing functions within the base station 180 related to monitoring a region of the medium for transmissions from other wireless communication devices that may be transmitting within the region at or near the same time. The monitoring may be part of a channel assessment used by a base station during a contention window to help mitigate the possibility of transmission collisions prior to the base station initiating a transmission operation. While various channel assessment methods may be used as noted herein (e.g. LTB categories 2, 3, 4 and/or extended clear channel assessment (eCCA), etc.), in one implementation, the base station 180 may configure a beam having directional components that include UEs 104 to which the base station intends to, or is likely to, transmit data in a DL channel in an ensuing transmission operation. Because the configured beam includes these different directional components depending on the known or anticipated locations of candidate receiving wireless devices (UEs), the configured beam is often referred to herein as a "wide" or "wider" beam, while beams specific to wireless devices or to portions of the wireless medium are occasionally referenced as "narrow" or "narrower" beams.

Medium monitoring component 171 may sense energy in the region using this wide beam for a specified period of time. If the energy detected during the contention window is below a threshold, then the Medium Monitoring Component 171 may conclude that the channel is clear and that the base station 180 can initiate a transmission operation in the region. In various implementations as discussed above, the Medium Monitoring Component 171 may dynamically select a threshold based at least in part on a width of the beam. For example, a smaller antenna gain and a wider beam may militate in favor of a lower threshold for the sensed energy as determined by Medium Monitoring Component 171 because the footprint for the base station may be correspondingly smaller. Conversely, a larger antenna gain and a narrower beam may necessitate the use of a higher threshold for the sensed energy, since these factors may bolster the gNB's footprint or coverage area as noted.

In various implementations, the base station 180 may also include Spatially Separated Beams and Beam Switching Components 198 to act in concert with the Medium Monitoring Component 171. Immediately prior to a medium monitoring event, e.g., in a Contiguous Contention Window (CCW) (LBT, eCCA, etc.), the Spatially Separated Beams and Beam Switching Components 198 may be responsible for determining and configuring the width of the beam and for providing this determination and configuration to the Medium Monitoring Component 171 for use in the CCW procedure. In various implementations, if it is determined that the region is free of transmissions such that the energy falls below a threshold, then the base station 180 may also use the Spatially Separated Beams and Beam Switching Components 198 for multiplexing transmissions onto different UEs 104.

For example, for a given UE 104, a narrow beam may be configured in the perceived or known direction of the UE (taking the UE's known range into account, where possible), and that narrow beam may be used to transmit data to the UE. Spatially Separated Beams and Beam Switching Components 198 may multiplex transmissions to two or more UEs by using these spatially separated directional beams as part of an SDM procedure.

In addition, other forms of multiplexing may be simultaneously or sequentially used to maximize throughput. For example, Spatially Separated Beams and Beam Switching Components 198 may combine space and time division multiplexing techniques by transmitting to at least one UE 104 during a first time interval and then may switch beams to transmit to at least one other UE 104 during a second time interval. In addition, Spatially Separated Beams and Beam Switching Components 198 and related components may use frequency division multiplexing to transmit FDM-based signals concurrently to more than one UE in the same vicinity.

Referring still to FIG. 1, the UE 104 may include Channel Reservation Component 173 for sending reservation signals during a transmission operation by the base station 180, to alert any outside wireless devices in the vicinity that the UE 104 is in the process of receiving a wireless transmission on the same frequency band. The reservation signals may be optional, and may be disabled to conserve bandwidth in certain circumstances as described with reference to various configurations herein.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A to 2D, examples of different frame structures and resources may be utilized by the base station 102 and/or the UE 104 for communications as described herein. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
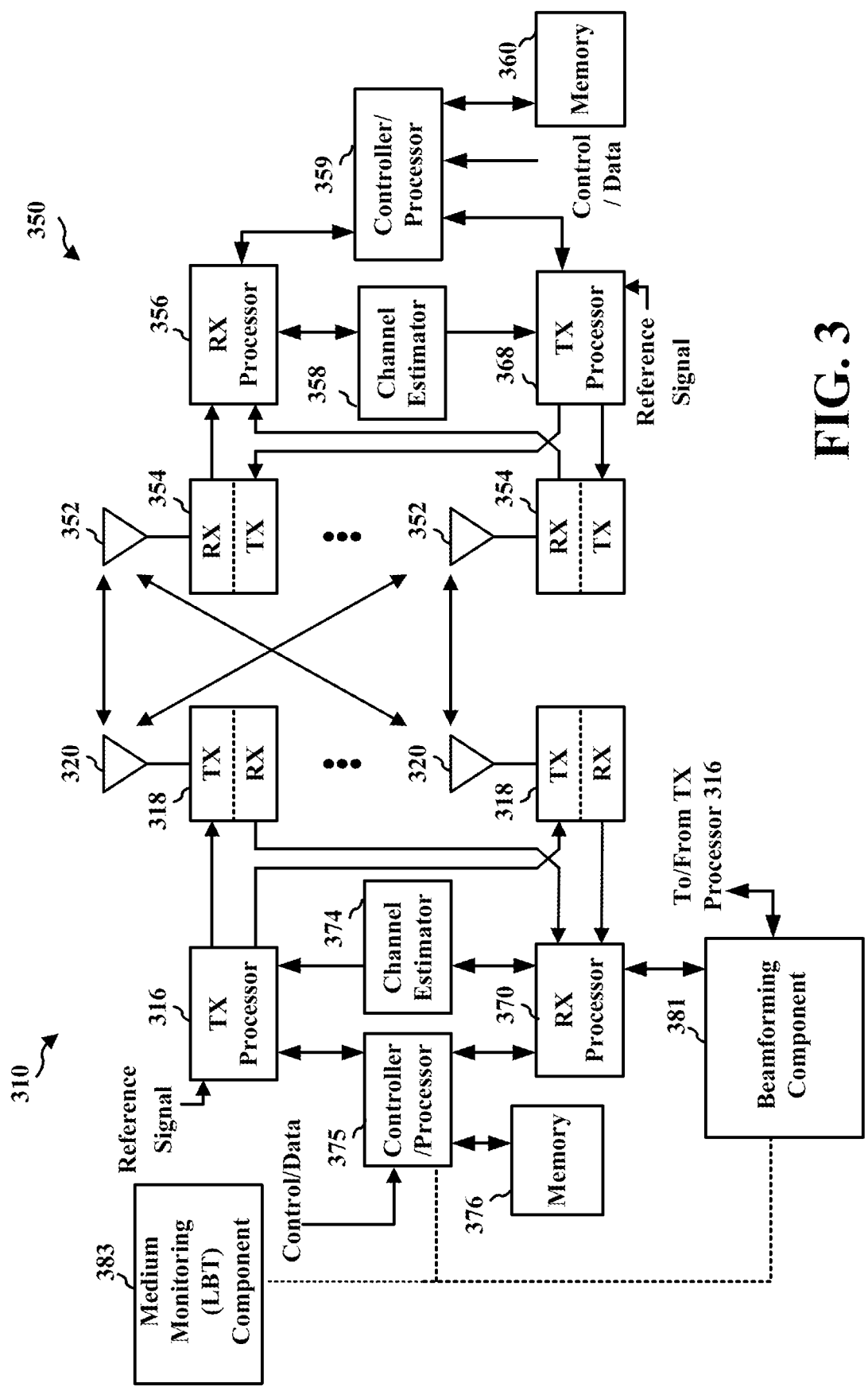
FIG. 3 is a diagram of an example of components of the base station and the user equipment.

Referring to FIG. 3, example components of the base station 310 and of the UE 350 are used for communication between one another in the access network 100. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission. These functions may be used to facilitate the beam configuring and beam switching techniques described in this disclosure. The TX processor 316, plurality of TX transmitters 318TX and corresponding plurality of antennas 320 may together form the means for transmitting to a plurality of wireless devices in the region using a plurality of spatially separated directional beams, as explained more fully with reference to FIGS. 4-14A. The plurality of spatially separated directional beams used in these transmissions may, for example, be generated by the Beamforming Component 381, discussed below. The TX processor 316, plurality of TX transmitters 318TX and corresponding plurality of antennas 320 may also be configured to time division multiplex and frequency division multiplex the spatially separated directional beams. The TX processor 316, plurality of TX transmitters and corresponding plurality of antennas 320 may also be used to perform beam-switching based on information provided from the Beamforming Component 381. The TX processor 316, plurality of TX transmitters and corresponding plurality of antennas 320 may time division multiplex division or frequency division multiplex the spatially separated directional beams, or perform some combination of both techniques.

Beamforming Component 381 is shown coupled to RX Processor 370 and TX processor 316. Beamforming Component 381 may form the means for forming at least one directional beam covering a region within a wireless medium and a plurality of spatially separated directional beams, as explained more fully with reference to FIGS. 4-14A. Beamforming Component 381 may, for example, provide information to the TX processor 316 or plurality of TX transmitters 318TX for phase-shifting the current through the different transmit antennas 318 in order to directionally steer an antenna array. In other implementations, these functions may instead be performed by the TX processor 316 and transmitters 318TX. Beamforming Component 381 may further provide information to the TX processor 316 or the plurality of TX transmitters 318TX information for time division multiplexing and frequency division multiplexing the plurality of spatially separated directional beams. In addition, Beamforming Component 381 may be used to provide information to the TX processor 316 or the plurality of TX transmitters 318TX for beam switching from one time division multiplexed transmission to another during a transmission operation. Beamforming Component 381 may also provide information to the TX processor 316 or plurality of TX transmitters 318TX for performing MIMO processing of the antenna signals. In various implementations, Beamforming Component 381 may be included within the circuitry of TX processor 316, RX processor 370 and/or other components. Alternatively or additionally, Beamforming Component 381 may be implemented as part of a separate circuit or set of circuits.

Beamforming Component 381 may also be responsible in some implementations for performing functions relating to LBT, for adjusting a threshold, and for dynamically varying the width of the beam during LBT periods and transmission operations. Similar functionality may be built into the UE for receiving antenna streams.

A Medium Monitoring (LBT) Component 383 is further illustrated for performing functions related to channel assessments as described in this disclosure. As indicated by the dashed lines, Medium Monitoring component 383 may be part of controller 375 (or other components), and it may share certain functions with Beamforming Component 381. Medium Monitoring Component 383 may form the means for monitoring a region within a wireless medium for transmissions using at least one directional beam covering the region, as explained more fully with reference to FIGS. 4-14AB, below. For example, the Medium Monitoring Component 383 may provide information to corresponding receivers RX318 or to RX processor 370 to introduce phase shifts to the current in a receive antenna array (for example, antennas 320) in order to form a receive beam that receives and senses energy from a specific direction relative to the antenna array 320.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At the UE 350, at least one of the TX processor 368, the RX processor 356, and the controller/processor 359 may be configured to perform aspects in connection with the group beam reporting component 117 as described herein.

At the base station 310, at least one of the TX processor 316, the RX processor 370, and the controller/processor 375 may be configured to perform aspects in connection with the beam management component 115 as described herein.

Figure 4:
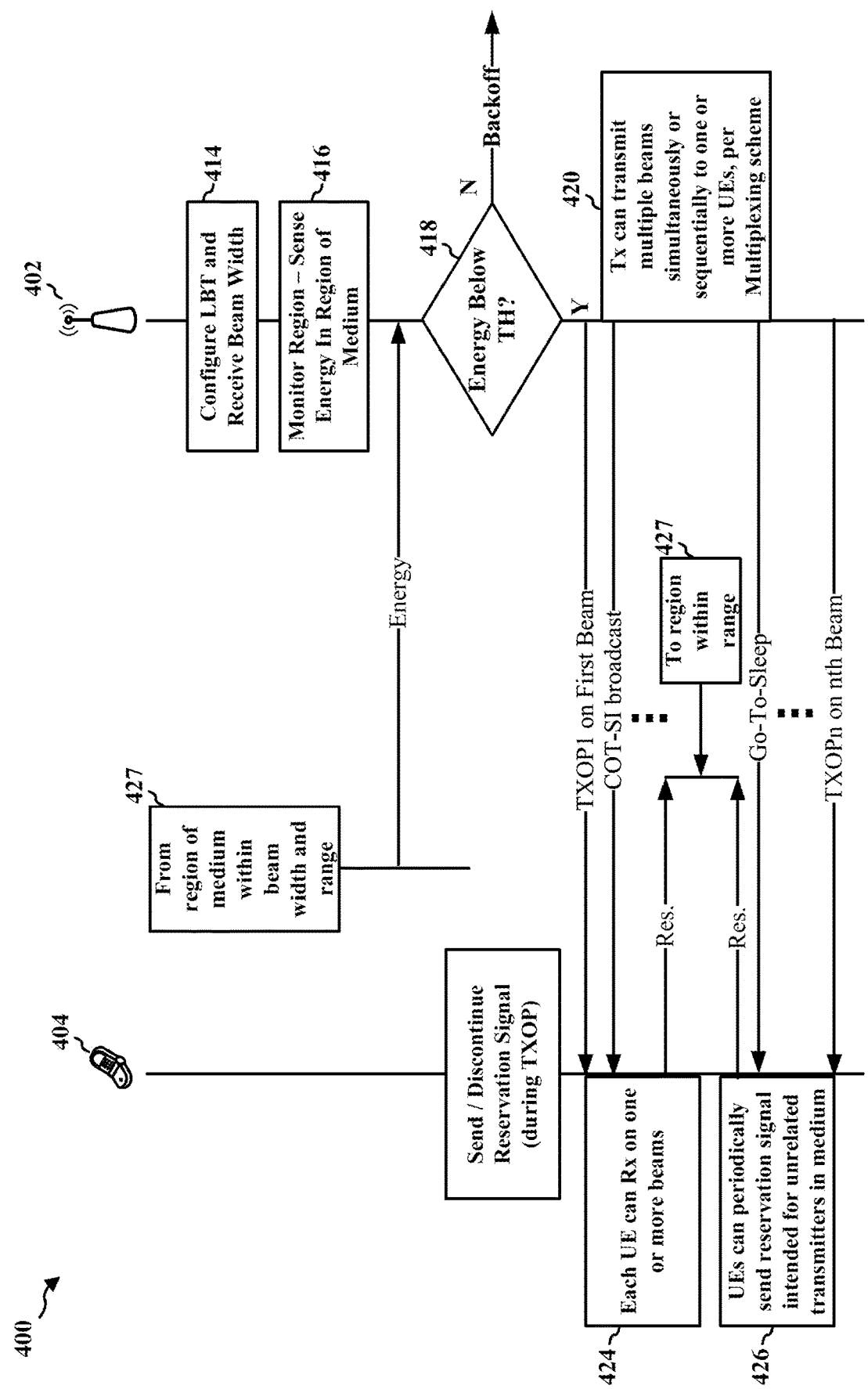
FIG. 4 is a timing diagram of wireless communications between the base station and the user equipment.

Referring to FIG. 4, an example signaling exchange 400 between the base station 402 and the UE 404 is presented. The base station 402 may, for example, include features of the base station 310 described in FIG. 3 or the base station 102/180 described in FIG. 1. Likewise, the UE 404 may include features of the UE 350 in FIG. 3, or the UE 104 in FIG. 1. In FIG. 4, for descriptive purposes, a group of n UEs 404 will be considered.

The base station 402 may have information to transmit to a plurality of n UEs 404. At block 414, the base station 402 may configure an LBT procedure and a receive beam width. The beam may be a wide beam that includes directional components towards each of the n UEs 404. The base station 402 may configure this information based on information available to the base station 402 about the relative locations of the n UEs 404 at about the time of the LBT. In an implementation, the base station 402 may also determine a threshold value based on the configured width and/or intensity of the beam (optionally along with other information about the surroundings or known devices in the region, or other relevant information).

Thereupon, at block 416, the base station 402 initiates the LBT by monitoring a region within the wireless medium. In an implementation, the base station 402 may use the configured receive beam to sense energy in the channel within the direction of the wide receive beam (block 427) and to compare the sensed energy with the determined threshold (418). If the sensed energy is under the threshold, the base station 402 may conclude that the channel is unoccupied and that the base station 402 can initiate a transmit operation. Otherwise, the base station 402 may defer transmission until a later time.

If the region is available, the base station 402 may perform a series of n transmit operations as illustrated in FIG. 4. In one optional configuration, the base station 402 may transmit data to the n UEs 404 using a corresponding number of n spatially separated directional transmit beams. As noted in block 420, the base station 402 (Tx) can transmit the n beams simultaneously or sequentially to one or more of the n UEs 404, depending on the multiplexing scheme chosen by, or available to, the base station 402.

In the implementation shown, the base station 402 may perform n transmission operations (TXOP1-n) using n time slots in a combined TDM/SDM transmission. Thus, for example, in a first time slot 1, the base station 402 transmits a first data message over a DL channel to a first UE 404 using a first narrow directional beam, in a second time slot 2, the base station 402 transmits a second data message over the DL channel to a second UE 404 using a second narrow directional beam, and so on until the base station 402 finally transmits an nth data message over the DL channel to an nth UE 404 using an nth narrow directional beam.

It should be noted that the multiplexing scheme may take on other forms and other techniques may optionally be used. For example, the base station 404 may decide to transmit messages to more than one UE using a single directional beam. Likewise, the base station may simultaneously transmit the data over more than one directional beam (e.g., a base station with multiple antenna arrays). The base station 404 may combine the above methods with FDM. Each UE 402 may receive the message on the DL channel in its respective time slot on its associated beam(s) (block 424).

In an implementation, the narrow directional beams 1-n all fall within the scope of the wide beam used in the LBT, to help assure that the region of transmission for all n UEs 404 is free of transmissions. In another implementation, the wide beam is initially configured to be just as wide to include only the n directional components. That is to say, in this latter implementation, the base station 402 may dynamically configure the width of the LBT receive beam to be limited to include the directional components of the UEs 404 to which the base station 402 is likely to transmit a message.

In an implementation, the base station 402 may send data to the UEs in the form of a broadcast message using a COT-SI (channel occupancy time-system information) as is known in the 5G-NR standard. As described in more detail below, the COT-SI may be used to provide information to the UEs 404 that assists in maximizing channel efficiency and minimize spurious transmissions of unwanted or unnecessary signals. In another implementation, the base station may also transmit a go-to-sleep signal to a specific UE.

Optionally, the UEs 404 may be configured to periodically transmit reservation signals, as described in block 426. The target of the reservation signals may not be the existing base station 402, but rather any devices in the region that are within the range of the UE transmitting the reservation signal, as shown in block 427. One function of the reservation signal as described herein is to indicate to devices in the region that the channel is currently occupied and that the UE is receiving data. Thus, even if an unrelated device in the vicinity (e.g., a WiFi station) may not receive the transmissions from the base station 402 due to, for instance, on the directional nature of the receive beam, the unrelated device may receive the reservation signal from the UE, which in some implementations may be an omnidirectional signal that the unrelated device may receive by happenstance, but nonetheless it may operate to avoid an unwanted collision between disparate transmissions.

The beam monitoring procedures and descriptions in blocks/elements 402, 404, 414, 416, 418 and 427 of FIG. 4 may, for instance, be performed by the Medium Monitoring Component 383 described above with respect to FIG. 3. The transmissions in block 420 may be performed by the TX processor 316, the plurality of TX transmitters 318TX and the corresponding plurality of antennas 320. The beamforming and spatial division multiplexing techniques may be performed by the Beamforming Component 381 in FIG. 3. Each of these techniques may be performed by additional or different components.

Figure 5:
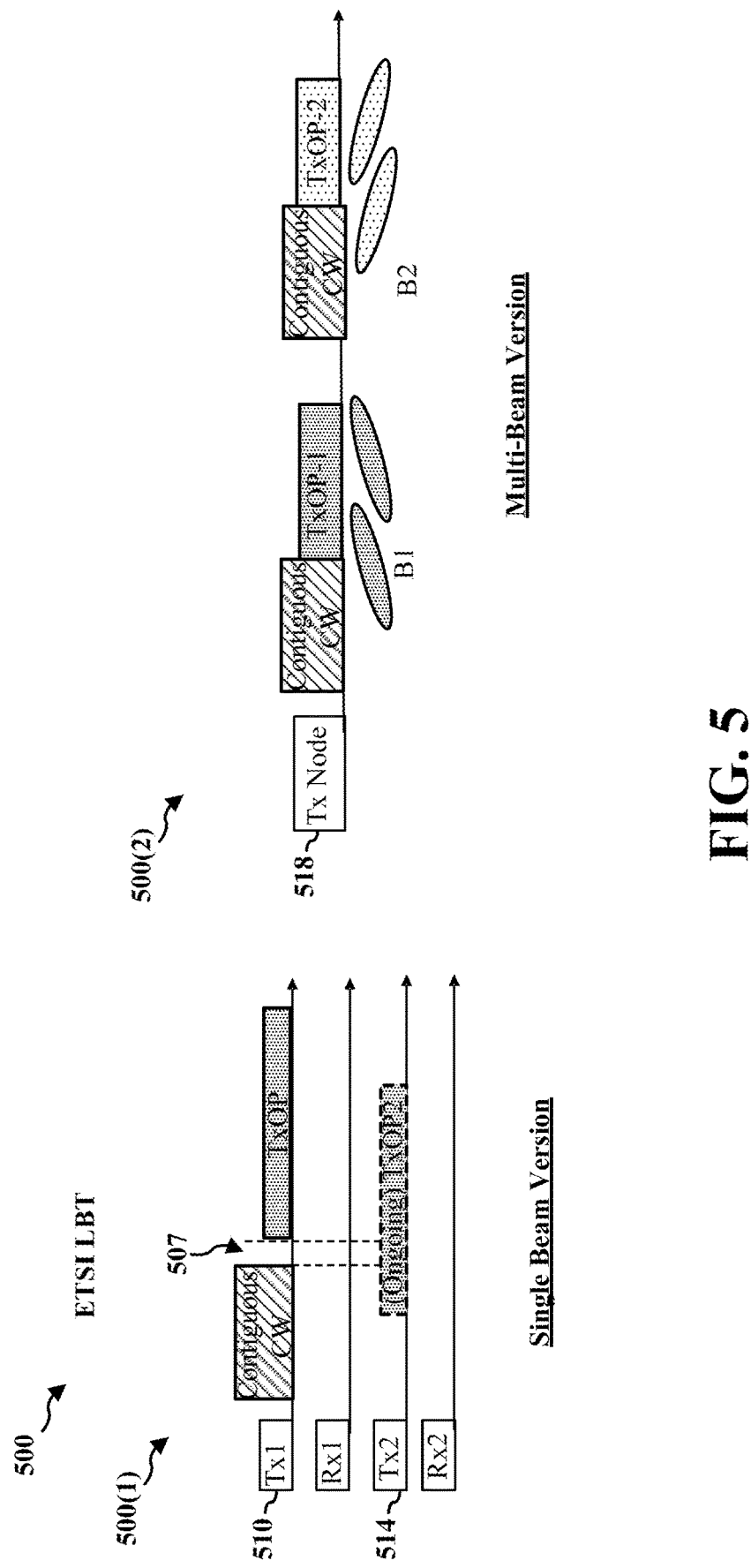
FIGS. 5-7 are timing diagrams of transmitter-based monitoring and transmission operations over a wireless medium.

FIG. 5 shows timing diagrams 500 of transmission-based energy sensing for user multiplexing schemes over a medium. It should be noted that for each of the diagrams in FIGS. 5-13 and for the flow chart of FIG. 14A, the channel assessment, energy sensing, CCW and LBT procedures (or similarly described techniques) may be implemented by the Monitoring Component 383. The transmitting operations may be implemented by the TX processor 316, plurality of TX transmitters 318TX and corresponding plurality of antennas 320. The beamforming and spatial division multiplexing procedures used in connection with the transmitting operations may be implemented by the Beamforming Component 381. However, in other implementations, these procedures may be performed by additional or different elements as is suitable for the implementation.

A conventional implementation (500(1)) using an LBT from ETSI (European Telecommunications Standard Institute) is first described. The described transmissions are assumed to take place in the mmW frequency band. At 510, a first transmitter, such as base station 310 of FIG. 3, initiates an LBT using a contiguous channel assessment (CCA). For example, in accordance with the ETSI standard, the transmitting device Tx1 performs the CCA for X µs. If the channel is free, Tx1 proceeds to occupy the medium after and, after the time in 507, transmits to Rx1 for up to 9 ms, as shown by the TxOP signal. At 514, Tx2 has a transmission TxOP2 to Rx that is ongoing prior to the beginning of the TxOP from Tx1.

The ongoing transmission may block the sensing by TX1, in which case TX1 may conclude that the channel is busy, and will not transmit during a subsequent TxOP2 (not shown). A disadvantage of this procedure includes the case where Tx2 does not otherwise interfere with a transmission to Rx1 (or alternatively, where Tx1 does not interfere with the transmission to Rx2). In these cases, if Tx1 foregoes transmitting, channel occupancy is not optimized. That is, transmission in this case is deferred by Tx1 even though both transmissions can have otherwise occurred simultaneously. An opportunity to transmit both signals and maximize bandwidth without interference may be lost. Accordingly, a need exists to increase the robustness, flexibility, and overall sophistication of the transmission based monitoring and transmitting procedures over the mmW band and other frequency bands.

The timing diagram 500(2) shows a case where instead multiple beams are used. In 500(2), each TxOP-1 and TXOP-2 in the transmission sequence 518 is configured to be beam specific. The first LBT uses a beam width B1 that is equivalent to the narrow beam used in the ensuing TxOP-1 transmission. The second LBT uses a beam width B2 that is equivalent to the narrow beam used in the TxOP-2 transmission. The sensing and transmission beams are matched to each other.

Figure 6:
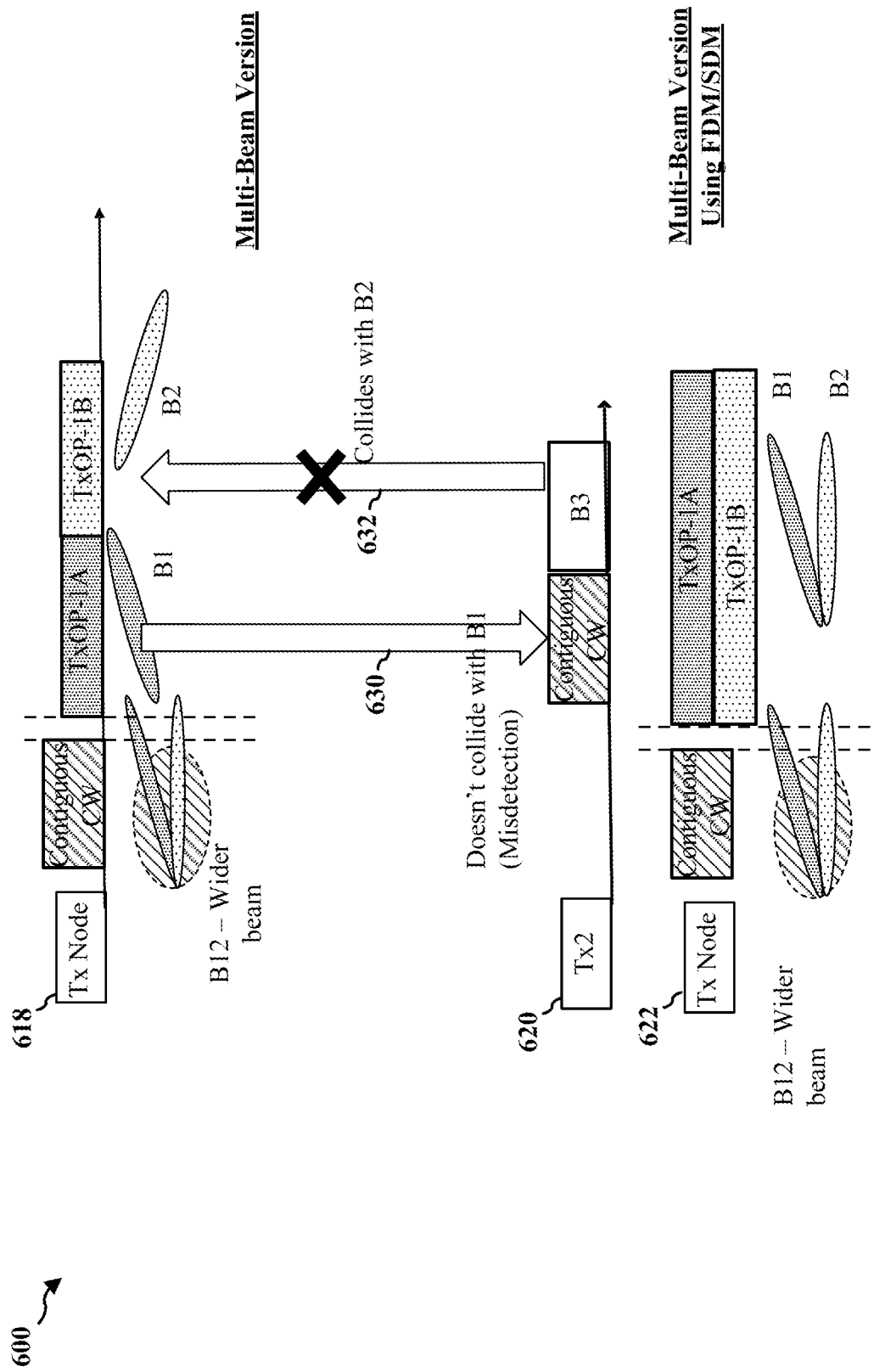

FIG. 6 shows timing diagrams of transmit-based energy sensing and transmission operations using different multiple beam configurations. At 618, a transmitting device TX, such as a base station 102/180 in FIG. 1 or base station 310 of FIG. 3, performs an LBT during the identified contiguous contention window using a wide beam that represents a combination of the narrow beams used in the subsequent transmitting operations. That is, in an implementation, the wide beam B12 that is used to sense energy within the contention window includes a combination of directional component beams B1 and B2. For example, the transmitting device may identify UEs that are known or likely to be recipients of a transmission, and based on that identification, the transmitting device configures the beam to include the combined directional components for the two beams B1 and B2.

In optional aspects, the energy detection threshold may be dynamically lowered by the transmitting device to account for the wider beam and therefore the decreased range of the signal.

Having detected the region within the beam to be free of transmissions, the transmitting device initiates a first transmission operation using spatially separated narrow beams B1 and B2. In an optional aspect, the transmitting device multiplexes transmissions using TDM and FDM. The transmitting device sends to a first receiving wireless device (such as a UE 104 in FIG. 1 or UE 350 in FIG. 3) a first transmission TxOP-1A using a first spatially separated directional beam B1 directed toward the particular receiving wireless device. The transmitting device sends to a second receiving wireless device a second transmission TxOP-1B using spatially separated directional beam B2. In this configuration, the transmitting device uses TDM to sequentially transmit to the two receiving wireless devices.

At 620, a second transmitting device, Tx2, may perform a CCW during a transmission operation TxOP-1A. In this example, as shown by arrow 630, it is assumed that the transmitting beam B1 is not detected by Tx2, resulting in misdetection in this case. Having detected a clear channel, Tx2 transmits over a third beam, B3, that is assumed to interfere with B2, and therefore the transmission TxOP-1B collides with Tx2's transmission over B3.

In a case (622) where the transmitting device instead transmits TxOP-1A and TxOP-1B concurrently using a combination of FDM and SDM, Tx2 is expected to sense the energy from B2 (assuming its receive beam includes a B3 directional component), and therefore Tx2 may properly defer its transmission (not shown), avoiding a collision here.

As the events in FIG. 6 illustrate, the base station's inclusion of additional directional components in the LBT operation can allow for greater scheduling flexibility. An inherent tradeoff may remain, however, between this flexibility, the impact of an interference event, and the failure or success of an LBT operation.

In conventional wireless contention techniques, a "one shot" LBT is generally used to access the medium. Challenges may arise, however, when a source of interference enters the region later during a series of transmissions. These conventional systems often lack the flexibility and sophistication to accommodate situations where multiple devices may be scheduled to receive data, particularly in situations where, as in some arrangements described herein, beam switching is used to multiplex transmissions to different UEs over time.

Figure 7:
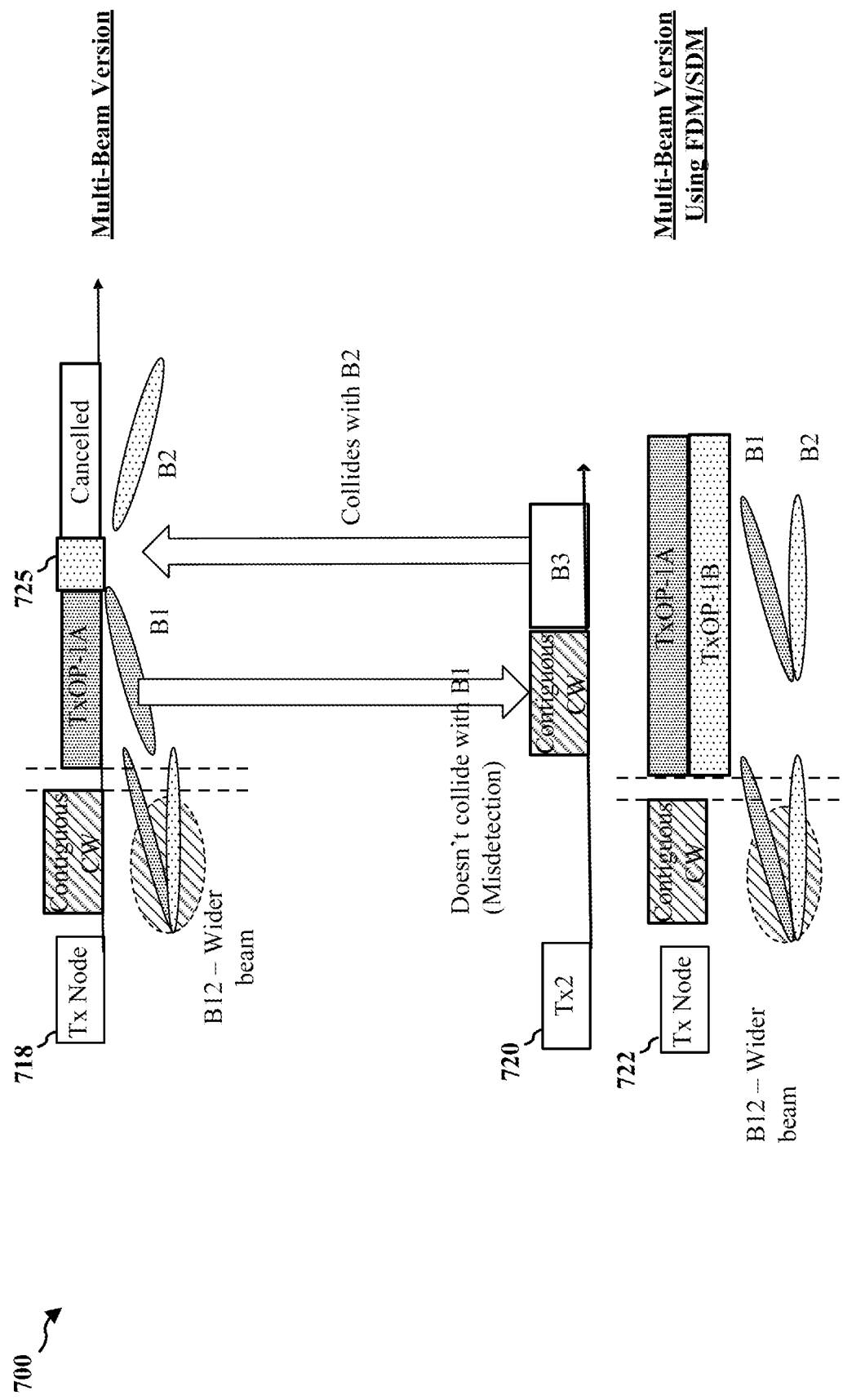

Accordingly, to address these conventional deficiencies in another optional implementation, a supplemental LBT may be performed every time the transmitting device makes a beam change. FIG. 7 shows timing diagrams 700 including a first diagram 718 with an LBT and a subsequent SDM/TDM operation, a second diagram 720 showing a potentially interfering node Tx2, and a third diagram 722 showing an alternative FDM operation by the transmitting device. After conducting an LBT in the CCW using a wide beam B12 having combined directional components, the transmitting device may determine that the region is free of transmissions. The transmitting device may send a first transmission using B1 to a receiving wireless device, as before. Next, the transmitting device may send during its Maximum Channel Occupancy Time (MCOT) period a short duration supplemental LBT 725 before initiating the DL transmission.

In one optional implementation, the supplemental monitoring is conducted using only the directional component for the anticipated upcoming transmission. Thus, after the TxOP-1A transmission using B1, the supplemental LBT is conducted only using B2 as the receive beam. In some implementations, the transmitting device may have a plurality of scheduled transmissions. After every beam change, the transmitting device may perform the supplemental LBT using, as the receive beam, the next directional beam associated with the next respective transmission. Thus, a string of transmissions can be made up to the maximum transmission window using a plurality of supplemental LBTs, each supplemental LBT using a distinct receive beam that is dependent on the transmit beam to be utilized thereafter.

Referring still to FIG. 7, the transmitting device may detect the ongoing transmission operation conducted by Tx2 in 720. Thus, the transmitting device may cancel the B2-based transmission to the scheduled receiving device, and the collision is avoided due to the Supplemental LBT.

It will be appreciated that while a supplemental LBT is demonstrated, the LBT may in some implementations be another type of supplemental channel assessment. In some implementations, the Supplemental LBT may be configured to be of short duration relative to the transmission operation to the wireless device, or it may be configured to be some percentage of the duration of an overall transmission, etc. The relatively short nature of the supplemental LBT means that, rather than conduct a bandwidth-consuming full duration LBT, only a short amount of time is used to double check the channel conditions before the next transmission.

In another optional implementation, to increase reliability of the supplemental LBT, the supplemental LBT may instead use a wide beam that is a combination of two or more beams, such as B1 and B2. In general, this so-called "wide beam supplemental LBT" may include both the currently anticipated narrow beam combined with one or more beams used in previous transmissions to earlier scheduled UEs. Such a supplemental LBT may include B1 and B2. While B1 was used in the transmission of TxOP-1A to a first receiving wireless device and may or may not be used in a subsequent transmission in the same period, a collision using a B12 combination in the supplemental LBT may increase the chance of detecting another transmitter that may still interfere with the transmitting device. For example, the other transmitter may be moving, or it may suddenly increase its beam power or direction, etc.

In yet another optional implementation, a supplemental LBT may be used as described above only with the next anticipated beam (here, B2), as before, but the transmitting device increases the LBT threshold. Using this implementation, the supplemental LBT is more narrowly tailored to both be short and to only report a conflict if the higher threshold is met. A benefit of this technique is that it avoids detecting an interference unless a potentially catastrophic collision is imminent, in which case the transmitting device backs off. At the same time, this technique retains the incentive for the transmitting device to attempt to schedule more transmissions, which may ultimately and beneficially maximize network usage.

In still other implementations, various combinations of the above supplemental LBT may be configured, dynamically or otherwise, depending on factors like whether overhead considerations (e.g., excessive time monitoring the medium) or collision avoidance is a more important criterion at the time the option is selected.

Diagram 722 shows an FDM/SDM based configuration, similar to 622 on FIG. 6. Because no beam switch occurs, the outcome is identical to 622. With a switch, a supplemental LBT may be performed to avert a possible collision.

Figure 8:
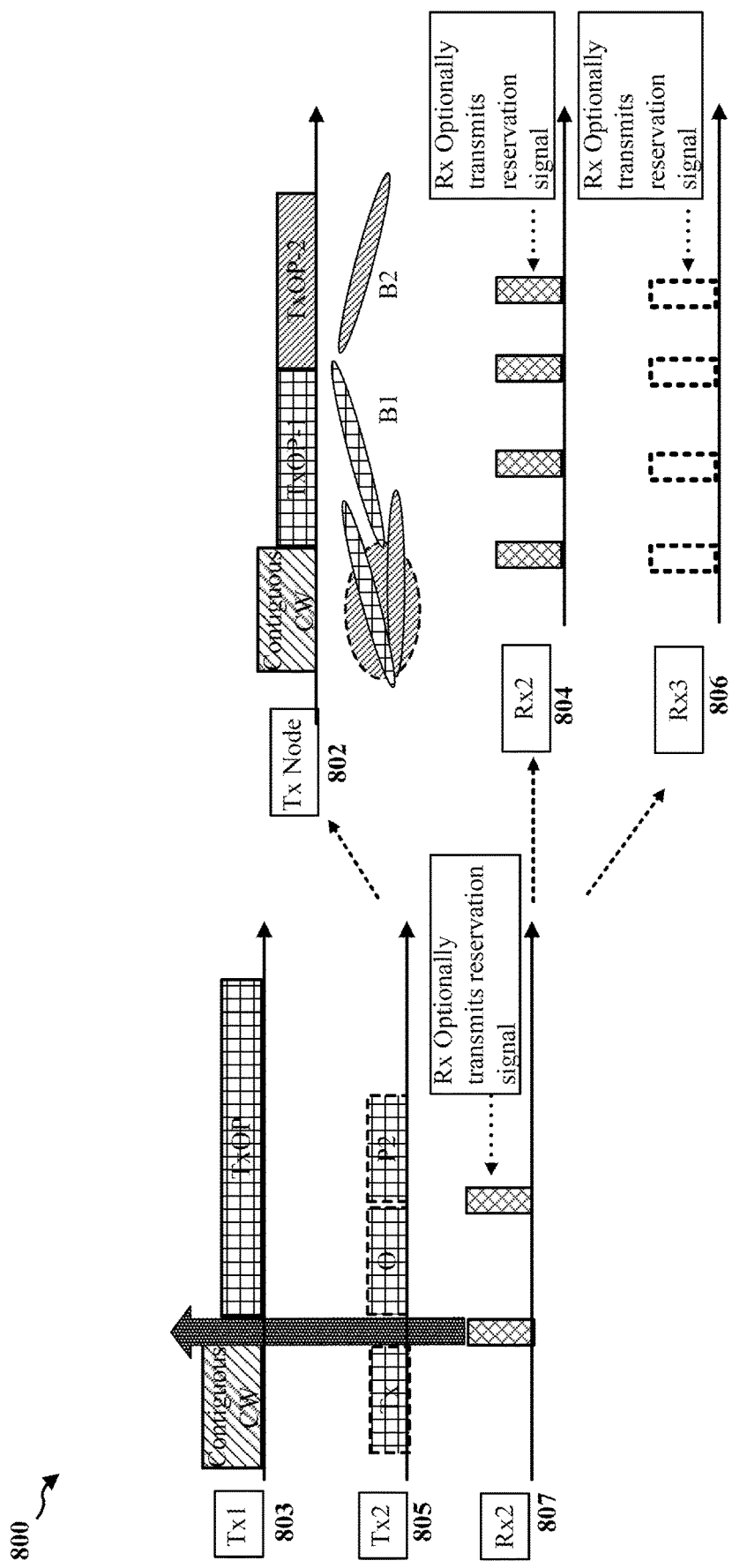
FIGS. 8-10 are timing diagrams of receiver-assisted, transmitter-based monitoring and transmission operations over a wireless medium.

FIG. 8 shows timing diagrams 800 for a receive assisted sensing and transmission procedure by a first transmitting device Tx1 as assisted by a receiving device 807. In 803, the transmitting device performs an LBT and a transmission, while a second transmitting device Tx2 is in the process of performing a series of transmissions (805). In 807, the receiving device (such as a UE 104) periodically and optionally transmits a reservation signal. As shown by the arrow, the reservation signal may be sufficient to alert the first transmitting device Tx1 that a transmission to the receiving signal is ongoing, even if the second transmitting device Tx2 is transmitting on a beam not received by Tx1.

In another implementation, the transmitting device Tx1 may dynamically assign a longer minimum contention period per beam to decrease the likelihood of a collision in circumstances where collision avoidance becomes more important. For example, the minimum contention period may be adjusted relative to the expected period of a reservation signal. If in 803 Tx1 receives either Tx2's transmission or a reservation signal within the adjusted time window, Tx1 may back off and cancel TxOP. Conversely, if Tx1 senses that the medium is free even using a longer contention window, Tx1 may elect to perform the TxOP transmission.

In another optional implementation, a transmitting device Tx Node in 802 may perform a sensing and transmitting procedure as shown. Tx Node may sense that the medium is free and may then perform time-division multiplexed transmissions TxOP-1 and TxOP-2 on B2 and B2 to receiving wireless devices Rx2 and Rx3, respectively. As shown in 804 and 806, both Rx2 and Rx3 are periodically transmitting reservation signals throughout the entire transmission period. Where a base station is sending transmissions to multiple UEs, the UEs may be transmitting overhead-consuming reservation signals without knowing whether they will actually receive a transmission from the base station.

Currently, a COT-SI field is defined in Release 16 of the 3GGP standard (5G-NR) that is common to the TxOP operation and that can be broadcast by the gNB to the UEs to identify the length of the transmission operation. COT-SI may enable the gNB to signal all of the UEs communicating with the gNB at once. In one optional aspect, the COT-SI field can be modified to enable the gNB to indicate to the UEs both the length of the transmission and which UEs will potentially be scheduled within the transmission and, if known, during what times.

More generally, a broadcast field can be defined for a transmitting device in an SDM system for providing the receiving devices with an identification of all receiving devices that may be scheduled during a transmission and during what times within the transmission the scheduling may occur for specific UEs. For example, referring back to the COT-SI, the gNB may indicate that a first UE will be scheduled only during a first 50% of the TxOP, a second UE may be scheduled any time during the TxOP, and a third UE may be scheduled between 25% to 75% of the TxOP's allotted length. Using this information, each UE can limit the transmission of its respective reservation signals to only certain periods within the transmit operation. After the UE's scheduled DL occurs, the UE can turn the reservation signal off. This implementation saves overhead and reduces medium interference.

In another optional aspect, to mitigate collision risk and to bolster the footprint or coverage area of the transmitting device or gNB (in 5G-NR), the gNB may configure all UEs that are potential recipients of DL transmissions to send a reservation signal periodically throughout the entirety of the transmission operation. In addition, the gNB may perform a single wide beam LBT with a threshold adjustment upward to account for the beam footprint difference. This implementation advantageously limits the number of LBTs required, and takes advantage of the positioning of the UEs to fend off prospective collisions. This implementation may be performed in concert with one or more other protective configurations. For example, the gNB may be configured to dynamically discontinue the reservation signals if over-reservation becomes a possibility.

Figure 9:
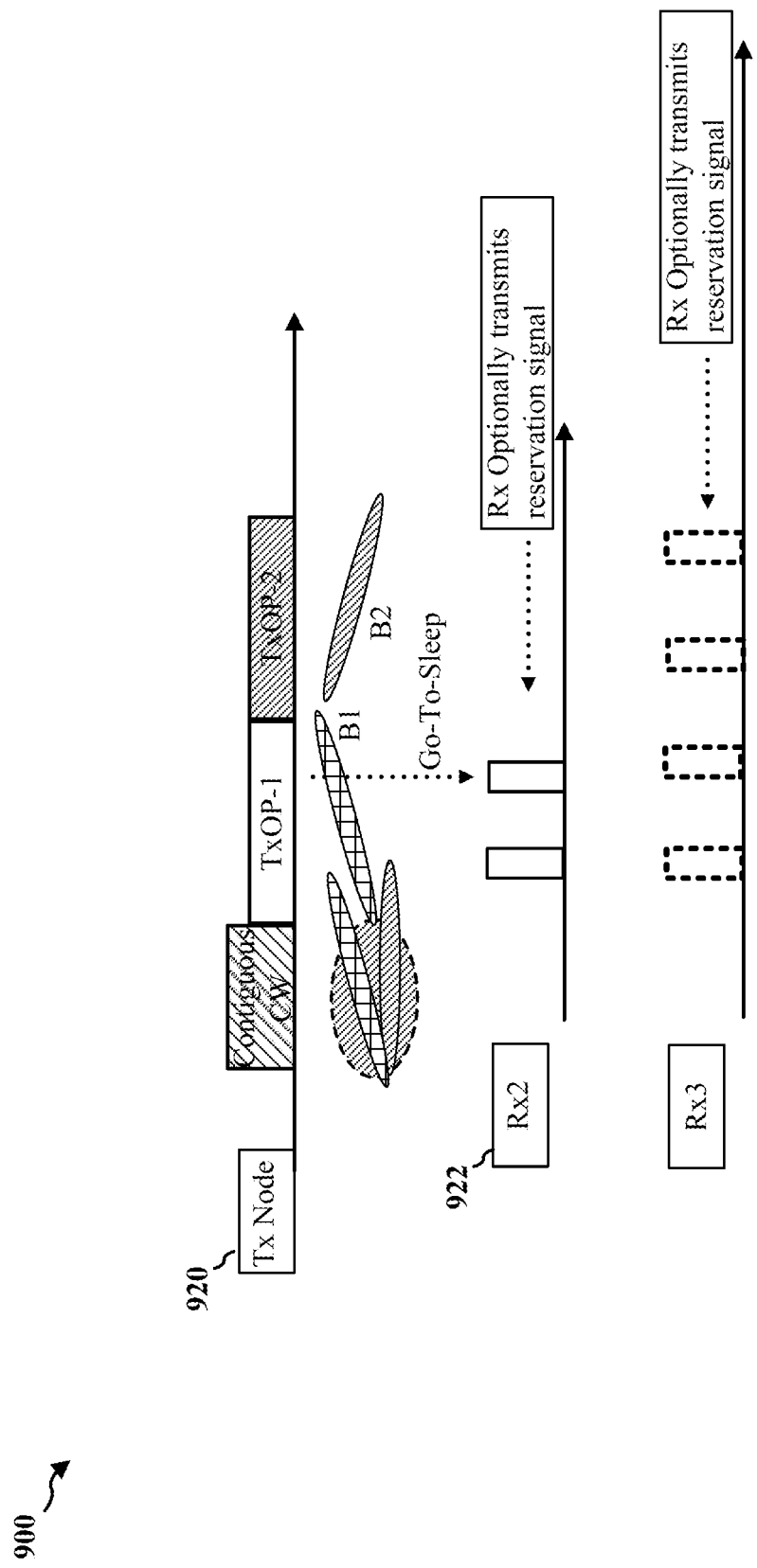

FIG. 9 show timing diagrams 900 of another receiver-assisted energy sensing procedure. A transmitting device, such as the base station 104/180 of FIG. 1 or the base station 310 of FIG. 3, performs a sensing and transmission procedure as in FIG. 8. Meanwhile, receiving devices such as UEs Rx2 and Rx3 may periodically transmit reservation signals. The transmission operation 920 shown is a persistent scheduling operation such that one UE is scheduled after another.

In an optional aspect, the base station may transmit a "go-to-sleep" signal to a specific UE of a plurality of UEs that are candidates for receiving a transmission from the base station. The go-to-sleep signal can be particularly useful when the base station can indicate an early termination time of a UE's COT. That is, the base station may determine that a particular UE will not be scheduled on the TxOP any longer. The go-to-sleep signal is a dynamic, base station-initiated signal that unlike the COT-SI signal heretofore described is specific to a UE. The go-to-sleep signal may indicate to the UE that it will no longer be scheduled. The go-to-sleep signal can include a specific or explicit instruction to the UE to discontinue sending reservation signals. This procedure beneficially mitigates against the possibility of over-reservation while conserving the benefits of existing reservation signals as a toolkit in the gNB's arsenal against interference from other sources.

In another optional aspect, the UEs may be configured to transmit reservation signals only during that UE's assigned portion of the TxOP. Referring to 922 of FIG. 9, UE Rx2 may be scheduled only during the TxOP-1. The UE transmits the two reservation signals as shown in 922, then terminates the transmissions during TxOP-2. With persistent scheduling, early termination by a receiving device is possible since the device may only be scheduled in an earlier portion of the TxOP. Particularly where a gNB is in the process of transmitting to a larger number of UEs, this procedure beneficially allows UEs to save power, and also can lower the overall interference level in the medium by removing UE signal transmissions that are no longer necessary. This also results in reduced UE power consumption.

In addition, in the case where receiver transmissions of reservations are limited, optionally, the gNB that performs the LBT may be configured to perform a single wide-beam LBT with a downward threshold adjustment to account for the beam footprint difference, which threshold may be lowered in the event UEs discontinue their reservation signals as is the case with Rx2 in FIG. 9. The base station may perform this downward adjustment because potential sources of interference may be less likely to identify the presence of the transmitting gNB if the total energy in the region is reduced due to a lower total reservation signal count.

Figure 10:
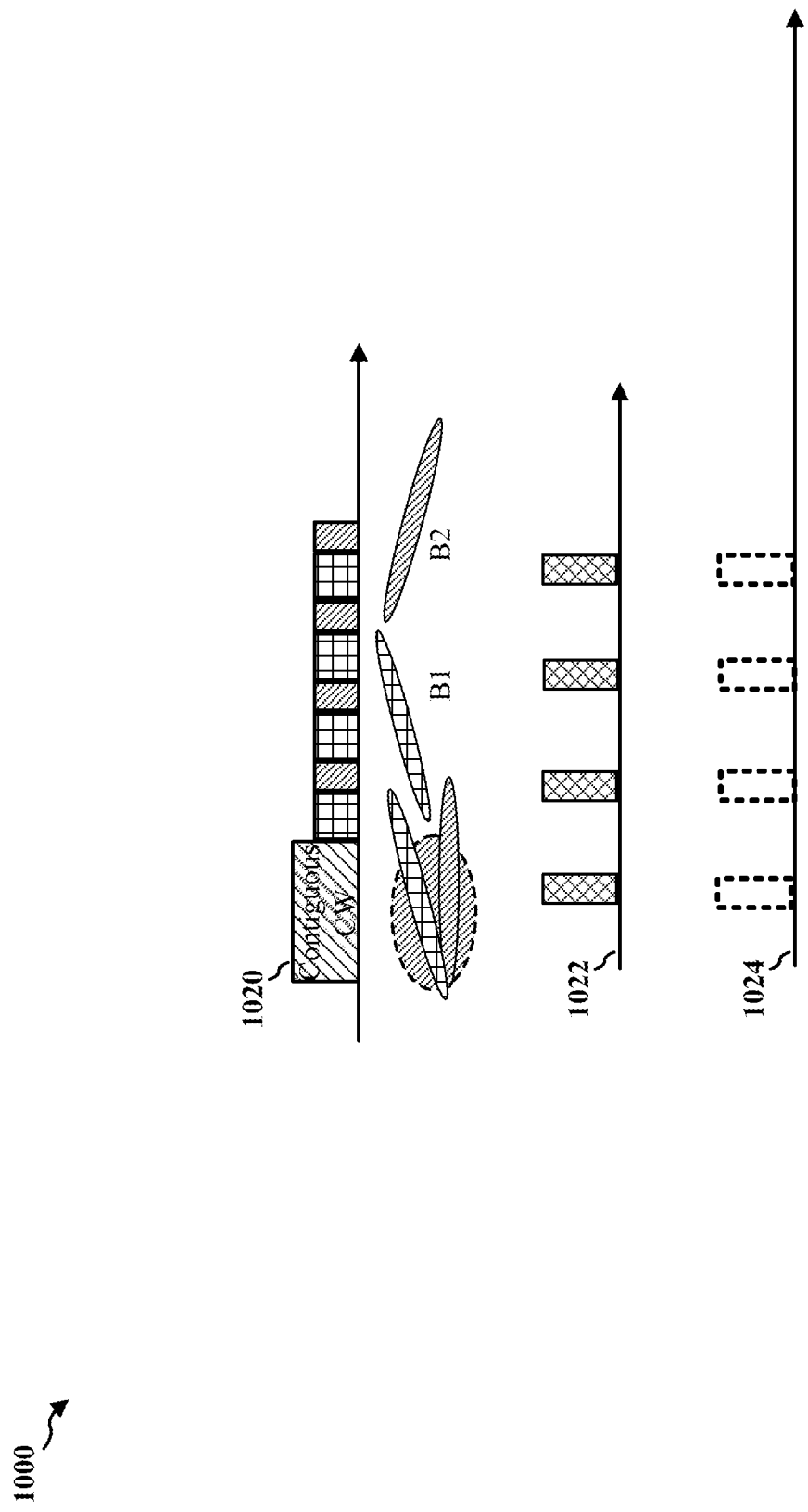

FIG. 10 shows timing diagrams of a transmitting device performing a single wide beam LBT followed by a bursty transmission in which the scheduling of the UEs is interleaved (1020). The nature of the bursty scheduling requires that receiving wireless devices be scheduled throughout the transmission operation. Although the reservation signals 1022 and 1024 should in one optional configuration not be discontinued in advance because the receiving devices may be scheduled to receive data throughout the transmission operation, the receiving devices may add the benefit of an increased footprint in this instance.

In another aspect with reference to FIG. 9 or 10, the transmitting device or base station may be configured to align or offset the reservation signals of multiple UEs to which the base station is transmitting. Aligning the reservation signals may be particularly beneficial to bolster the footprint of the base station in the event additional protection is needed from potential collisions. Conversely, the base station may elect to offset the reservation signals where a sequence-based procedure is used in lieu of an energy-based procedure.

Figure 11:
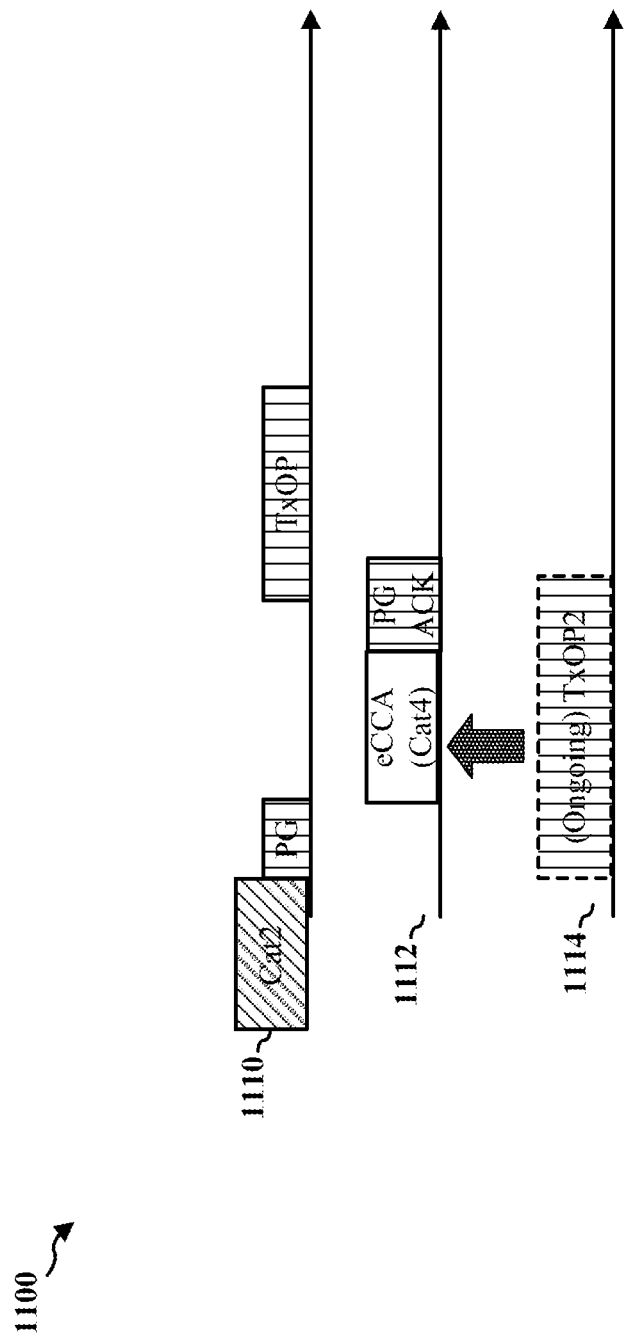
FIGS. 11-13 are timing diagrams of receiver based monitoring and transmission operations over a wireless medium.

FIG. 11 is an illustration of a receiver-based energy sensing technique. As shown in 1110, the transmitting device performs an LBT—in this instance, a category 2 LBT per the 3GPP standard. Upon determining that the media is free, the transmitting device sends a pre-grant signal to a receiving device. In an optional aspect of the disclosure, the pre-grant may inform the receiving device when to perform a channel assessment (e.g., an eCCA). For example, the pre-grant may inform the receiving device to defer its countdown for some specified time duration, such as one (1) ms. In another optional implementation, the pre-grant may also inform the receiving device when the receiving device should send an acknowledgment to the transmission. These implementations are described further in FIG. 12. The pre-grant may also indicate to the UE when a data transmission is to occur if the UE's channel assessment yields a clear channel.

At 1112, the receiving device performs a category 4 eCCA. If the receiving device (1112) determines that the medium is free over the fixed eCCA, it can respond with a pre-grant acknowledgment (PG ACK) to the transmitting device, in which case the transmitting device can perform a transmission operation. However, if an ongoing transmission from another device Tx1 (1114) is occurring in the region, the eCCA (1112) may detect the energy and may back off in response.

Figure 12:
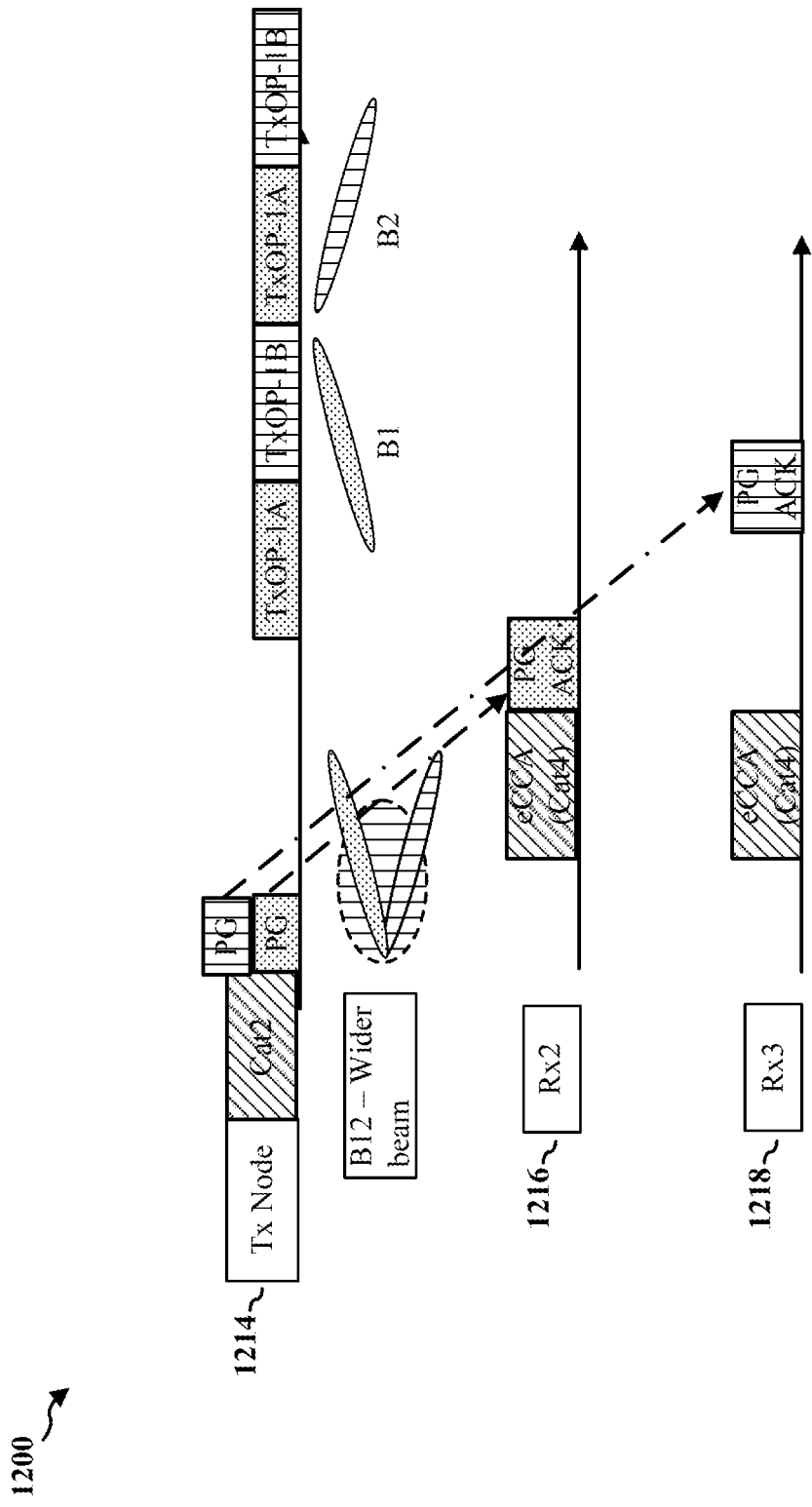

FIG. 12 is an illustration of a multiple beam version of the receiver-based sensing described in FIG. 11. A transmitting device Tx Node at 1214 may perform a category 2 LBT using a wide beam B12 including a combination of B1 and B2. Thereafter, Tx Node sends two pre-grant messages (PG) simultaneously to two receivers Rx2 and Rx3. In this arrangement, a common category 2 is used for sending the pre-grants. The pre-grants may provide the instructions to Rx2 and Rx3 as described above with reference to FIG. 11.

At 1216 and 1218, the receiving devices Rx2 and Rx3 may perform respective eCCAs followed by sending a PG-ACK. As noted above, in one implementation, the base station (Tx Node) may instruct each of Rx2 and Rx3 when to perform their eCCAs and when to send their respective PG-ACKs. This procedure may apply equally to a base station that is scheduling a larger number of UEs. In FIG. 12, the base station informs UE Rx3 to send its PG ACK right after Rx2 sends its PG ACK. It is noteworthy that because Rx2 and Rx3 are scheduled on a bursty, rather than persistent, basis, it may be beneficial to schedule these eCCAs PG-ACKs before the transmission burst as shown. The situation may differ, however, with a persistent scheduling.

Figure 13:
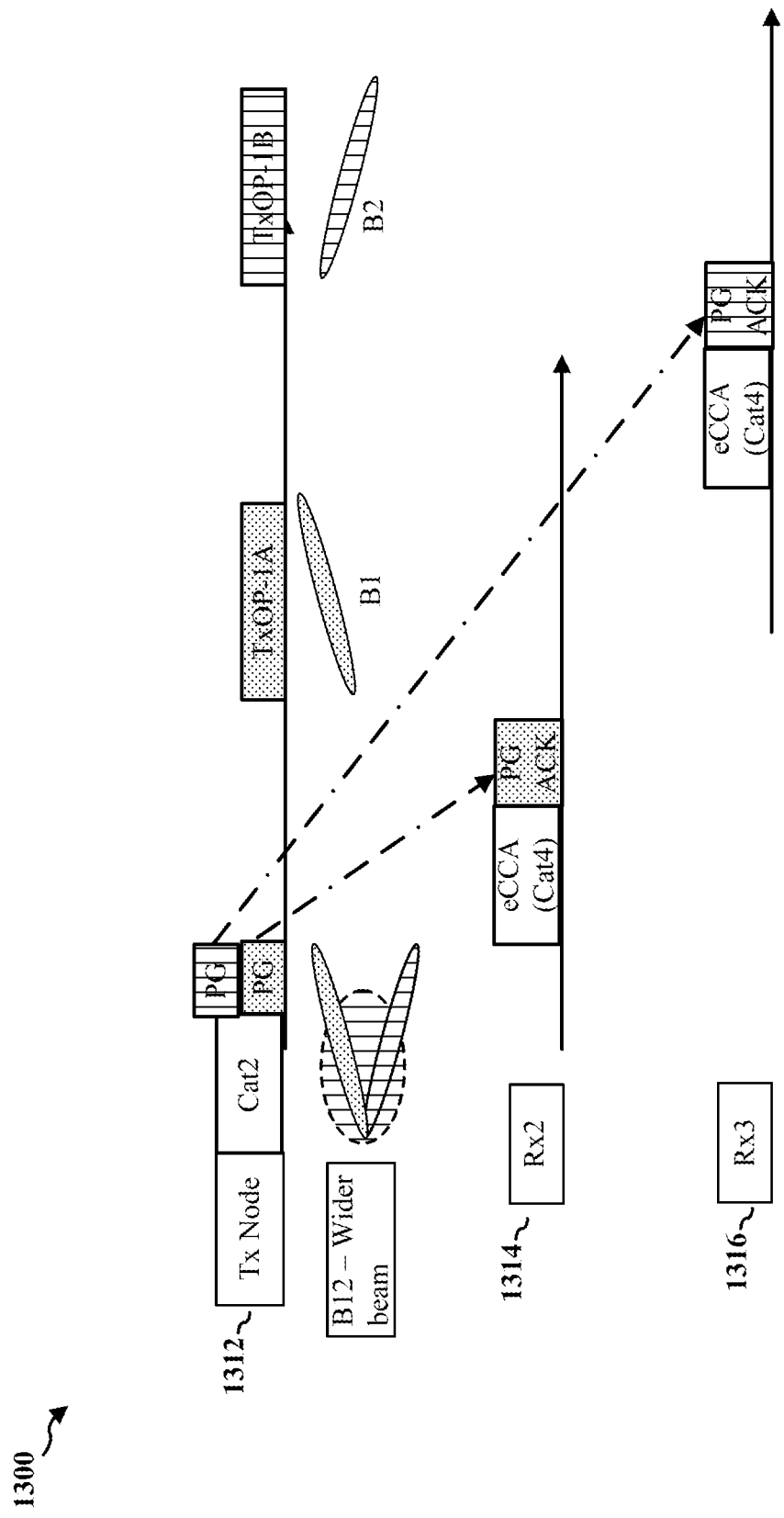
Figure 14:
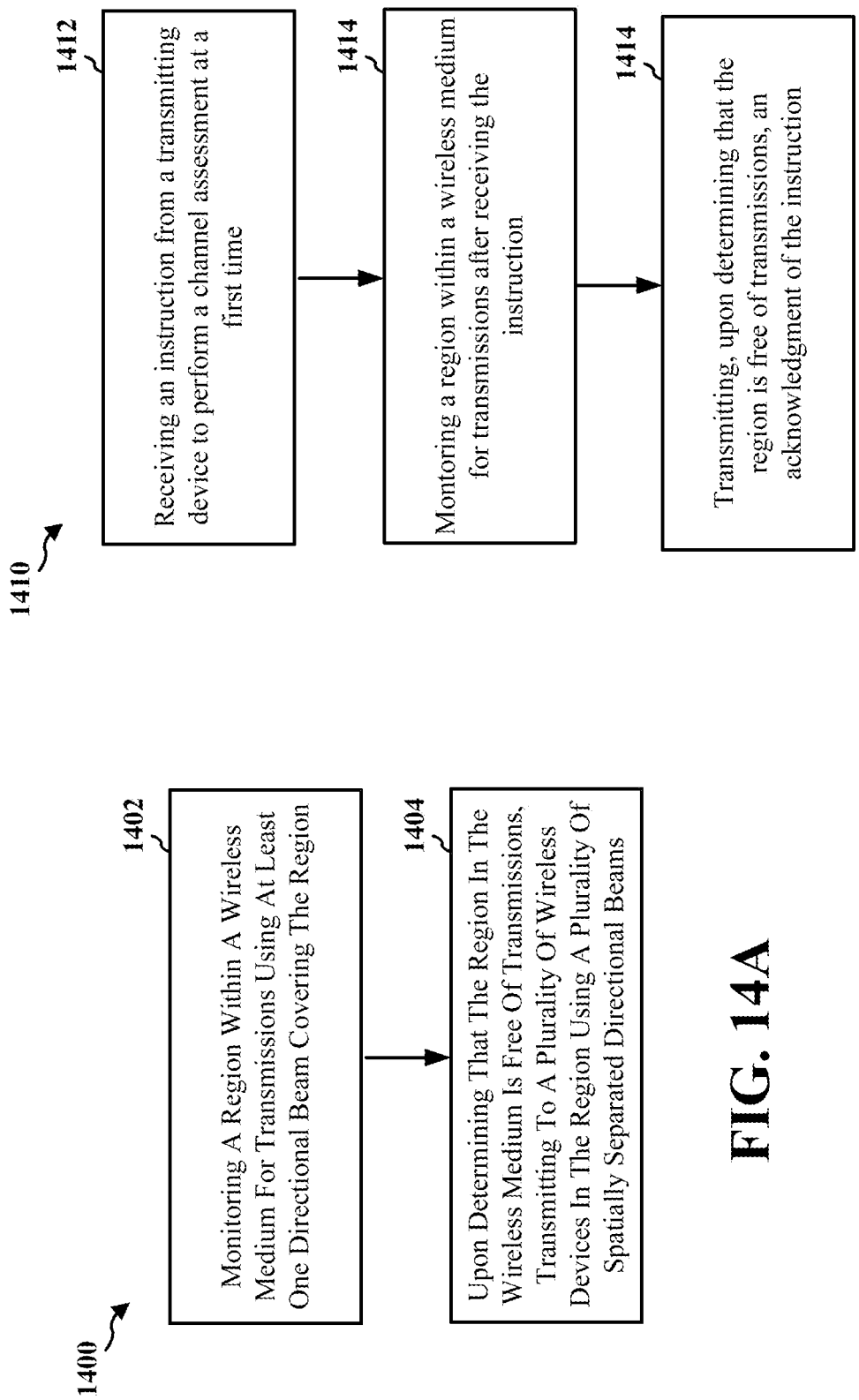
FIG. 14A is a flowchart of methods of wireless communication at a base station for monitoring a region within a wireless medium and transmitting to a plurality of wireless devices.
FIG. 14B is a flowchart of methods of wireless communication at a UE for receiving an instruction from the base station to perform a channel assessment for receiving a subsequent data transmission.

FIG. 13 shows another receiver-based sensing operation, also using a multiple beam format. As before, the Tx Node at 1312 performs a category 2 channel assessment followed by sending simultaneous frequency-multiplexed pre-grants to receiving devices Rx2 and Rx3. Unlike the bursty scheduling configuration of FIG. 12, however, the UEs are persistently scheduled over two single transmission periods TxOP-1A and TxOP-1B.

One of the benefits of this persistent scheduling implementation is that, by informing the receiving devices when to begin the eCCA and when to transmit the PG ACK, the base station can align the eCCA and PG ACK of the respective UE with the TxOP in which the UE is scheduled to receive data. For example, Rx2 in may be scheduled to receive data during TxOP-1A using B1. Thus, the Tx Node may instruct Rx2 in 1314 to perform its eCCA and send the PG ACK right after the Tx Node sends the pre-grant indication. The Tx Node may, however, advantageously defer Rx3's eCCA and PG ACK in 1316 until after the first TxOP-1A and before TxOP-1B, i.e., when Rx3 is scheduled to receive data during B2. Another benefit of this configuration is that the base station can prevent the UE (Rx3) from otherwise prematurely performing its eCCA and PG ACK well before Rx3 is scheduled to receive data, potentially enabling another source to begin transmitting over the medium prior to the UE in B2 being scheduled. This may result in Rx3 unnecessarily using the medium prior to receiving data, which may cost in overhead.

Instead, the base station can instruct one of multiple UEs to perform eCCA and send the PG ACK, for example, right before that UE is scheduled. The eCCA will be closer to the actual receiving by the UE of data, rendering it less likely that an intruding source will acquire the media after the UE sends its respective PG-ACK. As the number of UEs grows larger, the benefits of this deferred scheduling may become more apparent.

FIG. 14A is a flowchart 1400 of a method at a base station for performing multiple beam monitoring and transmitting. In a first step 1402, a transmitting device (e.g., a base station including an eNB, gNB, and the like) monitors a region within a wireless medium for transmissions using at least one directional beam covering the region. In a second step 1404, upon determining that the region in the wireless medium is free of transmissions, the transmitting device transmits to a plurality of wireless devices in the region using a plurality of spatially separated directional beams. In some implementations, the directional beam as described may be just a combination of the directional components of each of the plurality of spatially separated directional beams. In other implementations, the directional beam may be wider.

FIG. 14B is a flowchart 1410 for performing a method at a user equipment (UE), and in particular for receiving instructions for performing by the UE and for performing a clear channel assessment in advance of a scheduled data transmission to the UE. The configurations may include, in the 5G NR standard for example, receiving a pre-grant to perform a receiver-based eCCA or other channel assessment at a specified time, performing the eCCA, acknowledging receipt of the pre-grant at a time specified in the pre-grant, and subsequently receiving a data transmission that was scheduled in the pre-grant or otherwise.

At 1412, one of the plurality of UEs in the vicinity of the gNB may receive an instruction from a gNB to perform a channel assessment at a first time, such as a category 4 eCCA. In some configurations, the instruction may be a pre-grant that may instruct the UE to perform the eCCA, that may also provide further detail when to perform the eCCA, that may instruct the UE when to send a PG-ACK, and that may inform the UE, if known, the time that the UE is scheduled to receive the data.

At 1414, the receiving device (UE) monitors the region within the wireless medium for transmissions after receiving the instruction to perform the channel assessment. Upon detecting interference, the UE may perform back off and refrain from sending a PG-ACK. Upon determining that the region is free of transmissions, the UE may transmit an acknowledgment of the instruction. As noted, the UE's performing the channel assessment and acknowledgment may be performed at the time specified in the initial instruction (e.g., PG) or in another message.

Figure 15:
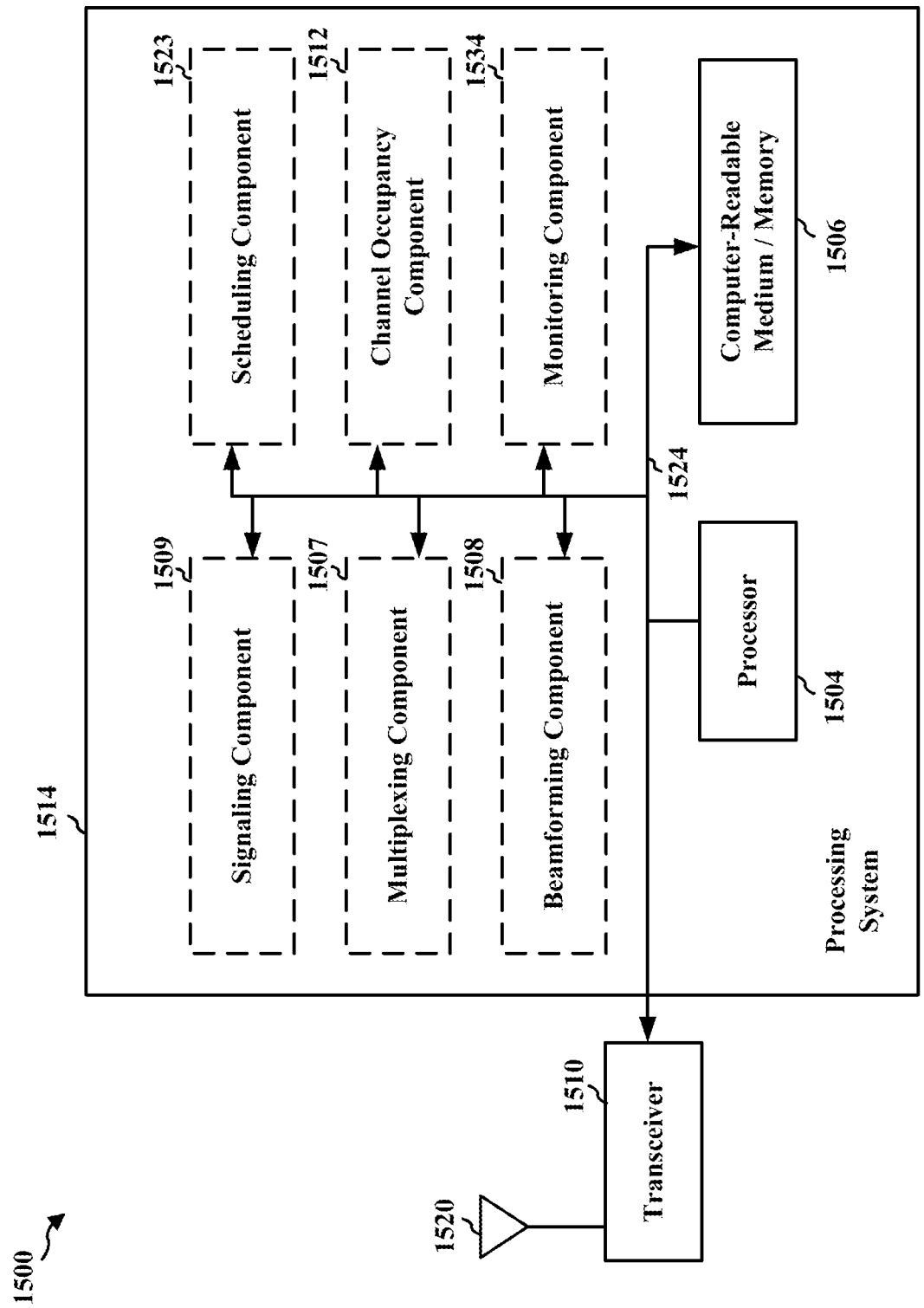
FIG. 15 is a block diagram of a base station including components for performing medium monitoring and spatially separated beam transmitting to UEs.

FIG. 15 is an exemplary illustration of a base station 1500 that performs monitoring of a region in a wireless medium and multiple beam transmissions. The base station may include a processing system 1514, a transceiver 1510, and an antenna 1520. The antenna 1520 and transceiver 1510 may constitute one or more arrays of antennas and/or receiver elements, directional antennas, steerable antennas and other antennas and arrays as described in part with reference to FIG. 3. The processing system may 1514 may include one or more components for providing functions related to the multi-beam monitoring and multiplexing methods as described herein.

A processor 1504, which may include one processor or a plurality of distributed processors, for example, may be coupled to transceiver 1510. The processor 1504 may further be coupled to a computer-readable medium 1506, which may include read only memory (ROM), random access memory (RAM), programmable memory, hard drives, solid state drives, disc drives and the like. The processing system 1514 may include a main bus 1524 which routes data to and from one or more components. It will be appreciated that one of more of these components may be part of the same component in certain configurations; in others, the components may be partitioned into various sub-components.

A scheduling component 1523 may be used to schedule various operations, such as when particular UEs are to perform channel assessments or pre-grant acknowledgments, when and under what circumstances to schedule reservation signals in various UEs, when and under what circumstances to persistently schedule data or to schedule bursty transmissions, and other scheduling criteria relating to the features and procedures described herein.

A signaling component 1509 may perform various functions relating to providing COT-SI information, go-to-sleep commands, and other instructions that may impact the duration of UE scheduling for monitoring purposes and otherwise.

A channel occupancy component 1512 may perform functions relating to scheduling multiple UEs to occupy a channel or receive data from the base station in a transmission operation.

A monitoring component 1534 may perform functions relating to channel assessment and LBT operations. To that end, the monitoring component 1534 may act in concert with beamforming component 1508 and other components to perform channel assessment techniques using a wide beam, including for example different categories of LBT or different types of channel monitoring.

A multiplexing component 1507 may perform functions relating to different multiplexing techniques including time and frequency division multiplexing, and may act in concert with beamforming component 1508 to provide SDM techniques for multiplexing a plurality of UEs on different spatially separated directional beams.

The beamforming component 1508 may be used to perform functions relevant to beam shaping, beam forming, spatial division multiplexing or otherwise producing transmit or receive beams for use in transmit or receive operations as described herein. The beamforming component 1508 may provide functions in varying antenna gain or producing phase shifts in antenna arrays to produce a wide beam that includes a combination of directional components that make up narrower beams for use in data transmissions. The beamforming component 1508 may also provide functions for producing the narrow beams directed towards different receiving UEs for use in transmitting data to or receiving data from different UEs.

Figure 16:
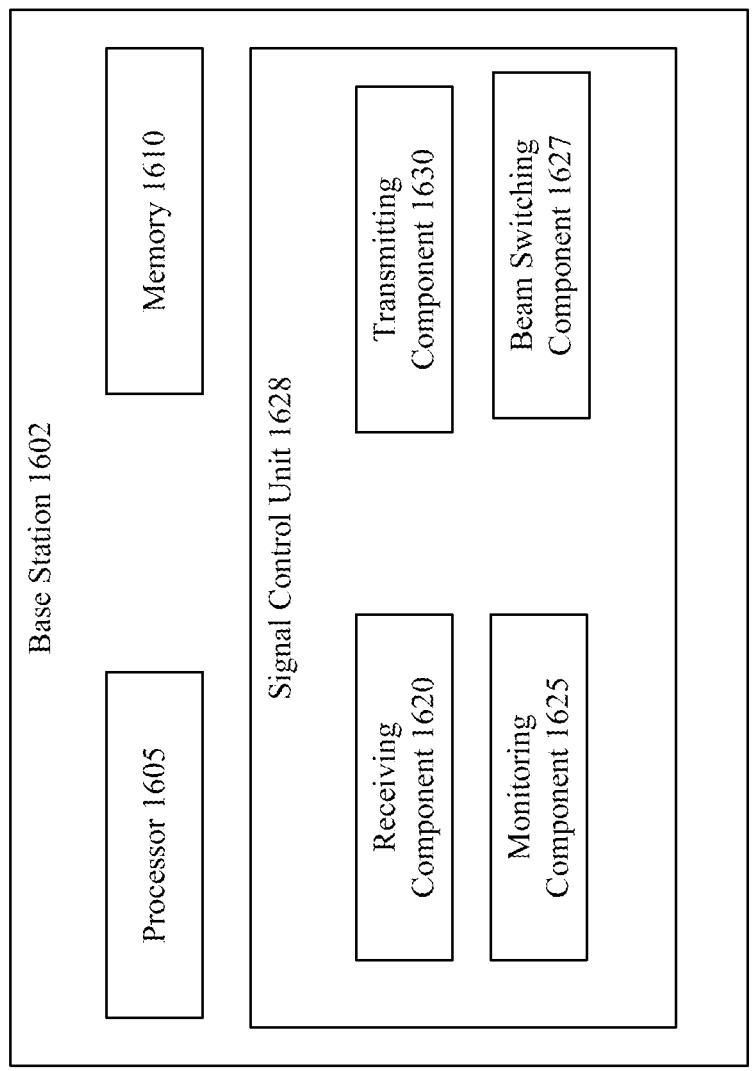
FIG. 16 is a block diagram of a base station including components for performing media monitoring and beam switching during transmitting.

FIG. 16 is another block diagram of a base station 1602. Base station 1602 may include a processor 1605 (which may as described with reference to FIG. 15 to include one or more processing elements), a memory 1610 coupled to the processor for storing data, and a signal control unit 1628. The signal control unit 1628 may be a unit for performing and controlling base station signaling relating to the operations and procedures described herein. The signal control unit 1628 may include, for example, a receiving component 1620 for receiving data and control signals that may govern the behavior of the base station 1602. The signal control unit 1628 may further include a transmitting component 1630 for performing transmit operations (TxOPs).

The monitoring component 1625 may control channel assessment and contention procedures, including LBT or other non-energy based schemes for monitoring the media. The beam switching component 1627 may include functions for switching beams to spatially and/or temporally multiplex transmissions over the beams to a plurality of corresponding UEs.

Figure 17:
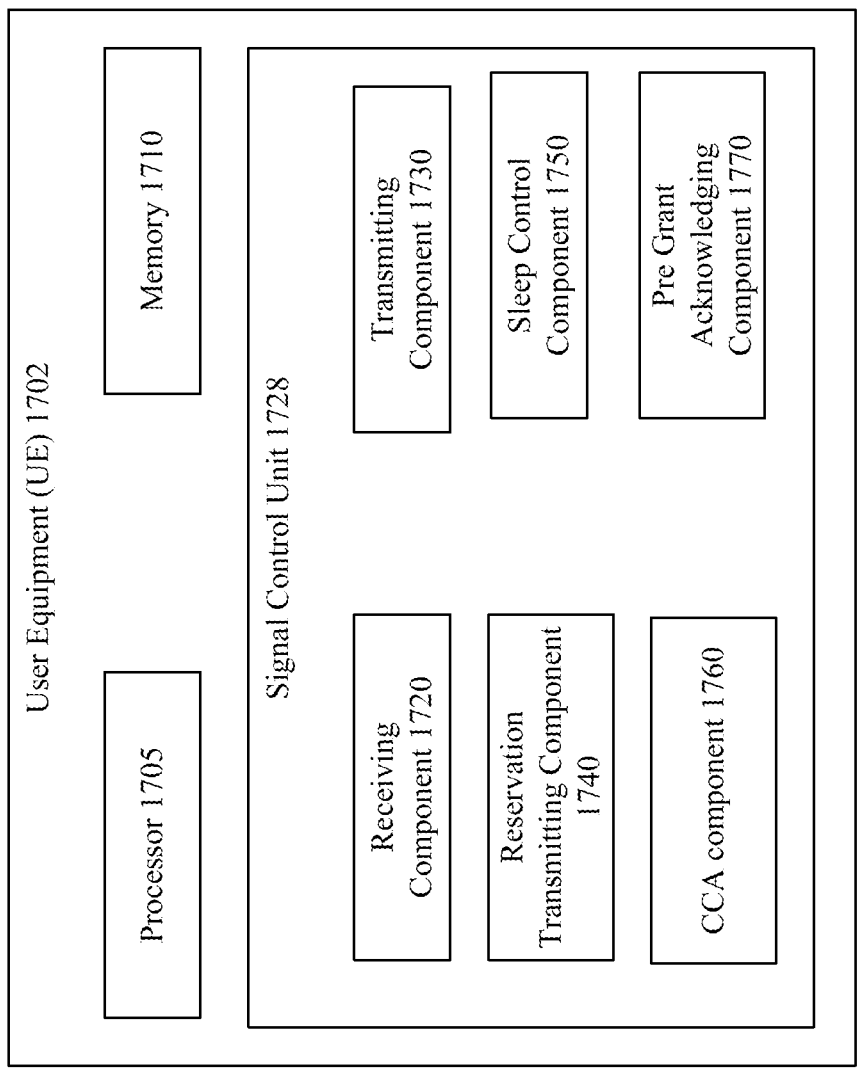
FIG. 17 is a block diagram of a user equipment for performing receiving of data, reservation signal transmitting and scheduling and sleep control.

FIG. 17 is a block diagram of a user equipment (UE) 1702. The UE may include a processor 1705, a memory 1710 coupled to the processor, and a signal control unit 1728 for controlling various actions of the UE 1702 based on instructions from the base station with which the UE is in communication and for providing other pertinent information to the base station.

The receiving component 1720 may include functions for receiving instructions from the base station including, for example, scheduling instructions for transmissions, channel occupancy instructions, instructions governing the transmission or discontinuation of channel reservation signals, and scheduling instructions for receiving data.

The transmitting component 1730 may include functions for transmitting control signals and data and for transmitting pre-grant acknowledgments prepared by the pre-grant acknowledgment component 1770. The reservation transmitting component 1740 may perform functions relating to initiating and terminating the transmission of reservation signals. The sleep control component 1750 may be responsible for activating and backing off in connection with scheduled base stations transactions, such as, for example, responding to a go-to-sleep command from the base station. The CCA component 1760 may be responsible for performing channel assessments when prompted by the base station, including for performing CCAs, eCCAs, etc.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The words "exemplary," "example," "implementation," "aspect," and the like are used herein to mean "serving as an example, instance, or illustration," and are not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    monitoring a region within a wireless medium to sense a level of interference within the region, wherein the monitoring is performed using at least one directional beam covering the region;
    upon determining that the level of interference sensed within the region satisfies a threshold condition, transmitting to a plurality of wireless devices in the region using a plurality of spatially separated directional beams, wherein a direction of the at least one directional beam covering the region is based on a combination of directional components associated with each of the plurality of spatially separated directional beams; and
    obtaining information for which the plurality of wireless devices are intended recipients, wherein the monitoring the region is performed in response to a determination that the plurality of wireless devices are within the region.

2. The method of claim 1, further comprising changing the threshold condition for determining the level of interference sensed within the region.

3. The method of claim 1, wherein the at least one directional beam comprises a beam wider than each of the spatially separated directional beams.

4. The method of claim 1, wherein the transmitting to the plurality of wireless devices comprises transmitting via time division multiplexing.

5. The method of claim 4, comprising further monitoring the region for a time period upon switching beams from one time division multiplexed transmission to another.

6. The method of claim 1, wherein the transmitting to the plurality of wireless devices comprises transmitting via frequency division multiplexing.

7. The method of claim 1, wherein the at least one directional beam comprises the spatially separated directional beams.

8. The method of claim 1, further comprising broadcasting throughout the region a message identifying which of the plurality of wireless devices are scheduled to receive a transmission.

9. The method of claim 1, further comprising transmitting to one of the plurality of wireless devices an indication that the one of the plurality of wireless devices is not scheduled to receive a transmission for a remainder of a transmission operation.

10. The method of claim 1, wherein transmitting to the plurality of wireless devices in the region further comprises transmitting the information to the plurality of wireless devices.

11. The method of claim 1, wherein the method further comprises:
    identifying the region based at least on locations of each of the plurality of wireless devices; and
    identifying the plurality of wireless devices based at least on obtaining information for which the plurality of wireless devices are intended recipients.

12. An apparatus for wireless communication, comprising:
    a transceiver configured to form at least one directional beam covering a region within a wireless medium and a plurality of spatially separated directional beams; and
    at least one processor configured to:
        execute monitoring the region to sense a level of interference within the region, wherein the monitoring is performed using the at least one directional beam;
        upon determining that the level of interference sensed within the region satisfies a threshold condition, transmit to a plurality of wireless devices in the region using the plurality of spatially separated directional beams, wherein a direction of the at least one directional beam covering the region is based on a combination of directional components associated with each of the plurality of spatially separated directional beams; and
        obtain information for which the plurality of wireless devices are intended recipients, wherein the monitoring the region is performed in response to a determination that the plurality of wireless devices are within the region.

13. The apparatus of claim 12, wherein the at least one processor is further configured to change the threshold condition for determining the level of interference sensed within the region.

14. The apparatus of claim 12, wherein the at least one directional beam comprises a beam wider than each of the spatially separated directional beams.

15. The apparatus of claim 12, wherein the processor is further configured to transmit to the plurality of wireless devices in the region via time division multiplexing.

16. The apparatus of claim 15, wherein the at least one processor is configured to further monitor the region for a time period upon switching beams from one time division multiplexed transmission to another.

17. The apparatus of claim 12, wherein the at least one processor is further configured to the plurality of wireless devices in the region via frequency division multiplexing.

18. The apparatus of claim 12, wherein the at least one directional beam comprises the spatially separated directional beams.

* * * * *